US012659380B2

(12) United States Patent
Kachare et al.

(10) Patent No.: US 12,659,380 B2
(45) Date of Patent: Jun. 16, 2026

(54) SYSTEMS AND METHODS FOR STORAGE-EFFICIENT SENSORS

(71) Applicant: Samsung Electronics Co., Ltd., Suwon-si (KR)

(72) Inventors: Ramdas P. Kachare, Pleasanton, CA (US); Ehsan Najafabadi, San Jose, CA (US); Oscar P. Pinto, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/235,243

(22) Filed: Aug. 17, 2023

(65) Prior Publication Data

US 2023/0403333 A1 Dec. 14, 2023

Related U.S. Application Data

(63) Continuation of application No. 16/927,858, filed on Jul. 13, 2020, now Pat. No. 11,778,055.

(51) Int. Cl.
| | |
|---|---|
| *H04L 67/51* | (2022.01) |
| *H04L 67/1095* | (2022.01) |
| *H04L 67/1097* | (2022.01) |
| *H04L 69/16* | (2022.01) |
| *H04Q 9/00* | (2006.01) |
| *G06F 15/173* | (2006.01) |

(52) U.S. Cl.
CPC .......... *H04L 67/51* (2022.05); *H04L 67/1095* (2013.01); *H04L 67/1097* (2013.01); *H04L 69/16* (2013.01); *H04Q 9/00* (2013.01); *G06F*

*15/17331* (2013.01); *H04Q 2209/30* (2013.01); *H04Q 2209/40* (2013.01)

(58) Field of Classification Search
CPC . H04L 67/51; H04L 67/1095; H04L 67/1097; H04L 69/16; H04Q 9/00; H04Q 2209/30; H04Q 2209/40; G06F 15/17331
See application file for complete search history.

(56) References Cited

U.S. PATENT DOCUMENTS

| | | | |
|---|---|---|---|
| 7,849,274 B2 * | 12/2010 | Pittman | ................... G06F 3/067 |
| | | | 711/154 |
| 9,301,325 B1 | 3/2016 | Sanap et al. | |
| 9,798,736 B2 | 10/2017 | Sirianni et al. | |
| 10,015,272 B2 | 7/2018 | Zhong et al. | |

(Continued)

FOREIGN PATENT DOCUMENTS

| | | |
|---|---|---|
| CN | 105474205 A | 4/2016 |
| CN | 110633247 A | 12/2019 |

(Continued)

*Primary Examiner* — Viet D Vu
(74) *Attorney, Agent, or Firm* — Womble Bond Dickinson (US) LLP

(57) ABSTRACT

Provided are systems, methods, and apparatuses for providing storage-efficient sensors. A method can include: using a discovery service to determine one or more parameters associated with a storage device via a network over a medium; transmitting data from at least one sensor to a storage device via the network over the medium; processing the data and storing at least a portion of the data at the storage device; and transmitting at least a second portion of the data via the network to at least one host.

20 Claims, 14 Drawing Sheets

100

102 sensor 104 gateway compute 106 cloud compute

(56) References Cited

U.S. PATENT DOCUMENTS

| | | | |
|---|---|---|---|
| 10,175,891 B1 | 1/2019 | Malwankar et al. | |
| 10,223,254 B1 | 3/2019 | Frolikov | |
| 11,315,024 B2 | 4/2022 | Gil Bulacio et al. | |
| 2006/0026118 A1 | 2/2006 | Jung et al. | |
| 2006/0026164 A1 | 2/2006 | Jung et al. | |
| 2006/0106581 A1 | 5/2006 | Bornhoevd et al. | |
| 2007/0001836 A1 | 1/2007 | Singer et al. | |
| 2010/0188197 A1* | 7/2010 | Ackley | G08C 17/02 |
| | | | 340/10.1 |
| 2011/0016287 A1* | 1/2011 | Acedo | G06F 3/0689 |
| | | | 711/E12.001 |
| 2012/0166437 A1 | 6/2012 | Esteve Balducci et al. | |
| 2013/0041866 A1 | 2/2013 | Simske et al. | |
| 2013/0166726 A1* | 6/2013 | Boldyrev | G06Q 10/10 |
| | | | 709/224 |
| 2013/0211546 A1 | 8/2013 | Lawson et al. | |
| 2014/0043961 A1 | 2/2014 | Saida | |
| 2014/0094124 A1 | 4/2014 | Dave et al. | |
| 2014/0187143 A1 | 7/2014 | Starnes | |
| 2014/0320308 A1 | 10/2014 | Lewis | |
| 2014/0344269 A1 | 11/2014 | Dong et al. | |
| 2015/0006663 A1* | 1/2015 | Huang | H04L 67/1097 |
| | | | 709/213 |
| 2015/0124169 A1 | 5/2015 | Jiang et al. | |
| 2015/0212878 A1* | 7/2015 | Segev | G06F 11/1048 |
| | | | 714/764 |
| 2017/0041319 A1 | 2/2017 | Barrett et al. | |
| 2018/0077211 A1* | 3/2018 | Rose | H04L 41/0806 |
| 2018/0120132 A1* | 5/2018 | Tanutama | G01D 18/00 |
| 2018/0146058 A1 | 5/2018 | Somayazulu et al. | |
| 2018/0341429 A1* | 11/2018 | Bolkhovitin | G06F 3/067 |
| 2019/0108158 A1 | 4/2019 | Kachare et al. | |
| 2019/0272474 A1 | 9/2019 | Ting | |
| 2020/0118058 A1 | 4/2020 | Larsen | |
| 2020/0329104 A1 | 10/2020 | Narayanasamy et al. | |
| 2021/0144207 A1* | 5/2021 | Yasay | H04L 67/1097 |
| 2021/0241926 A1 | 8/2021 | Chor et al. | |

FOREIGN PATENT DOCUMENTS

| | | |
|---|---|---|
| CN | 110832828 A | 2/2020 |
| EP | 1 954 004 A1 | 8/2008 |
| KR | 1020180112065 | 12/2019 |
| TW | 201644255 A | 12/2016 |
| WO | 2019/213441 A1 | 11/2019 |

* cited by examiner

300

219

302

314 — Network Interface

312 — Host Interface NVMe-oF

310 — Data Buffer

308 — Preprocessor

Digital Data

306 — Analog-Digital Converter (ADC)

Raw Data

304 — Sense Element

1500

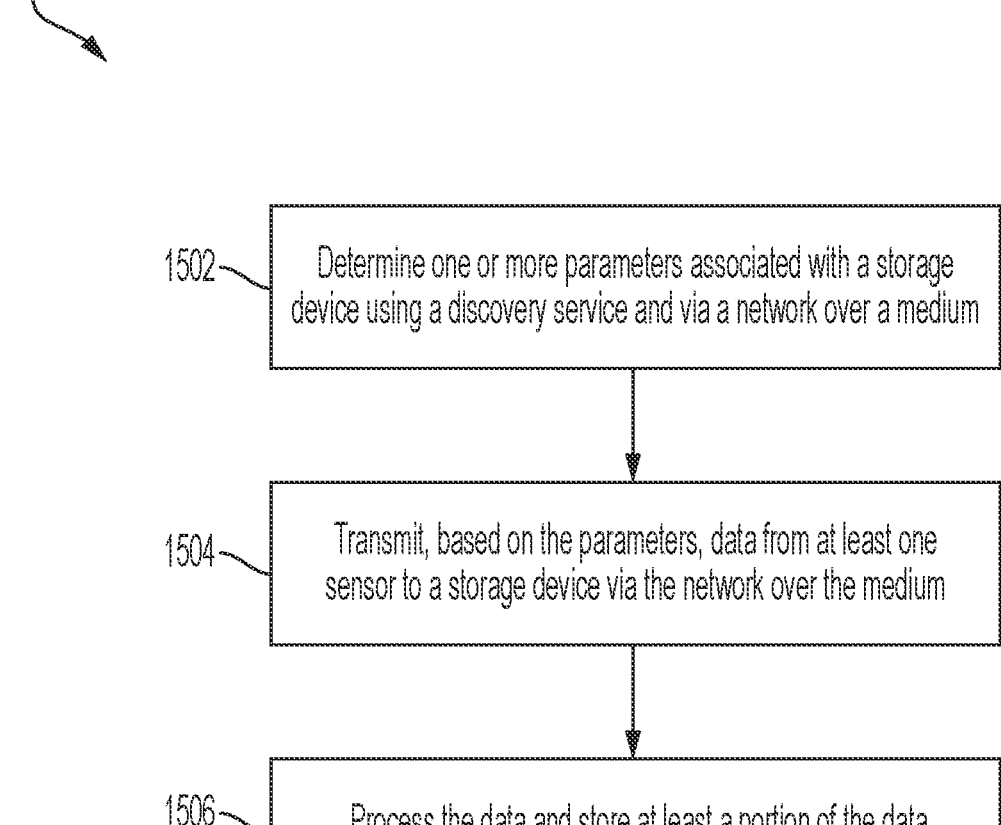

1502 — Determine one or more parameters associated with a storage device using a discovery service and via a network over a medium 1504 — Transmit, based on the parameters, data from at least one sensor to a storage device via the network over the medium 1506 — Process the data and store at least a portion of the data at the storage device 1508 — Transmit at least a second portion of the data via the network to at least one host

FIG. 15

SYSTEMS AND METHODS FOR STORAGE-EFFICIENT SENSORS

CROSS-REFERENCE TO RELATED APPLICATION(S)

This application is a continuation of U.S. patent application Ser. No. 16/927,858, filed Jul. 13, 2020, now U.S. Pat. No. 11,778,055, the entire disclosure of which is incorporated by reference herein.

FIELD

The present disclosure generally relates to sensors and storage, and, more specifically, to systems and methods for data storage of data generated by sensors.

BACKGROUND

In various information technology (IT) systems, sensors can be used to capture data from their environment. Some non-limiting examples of sensors include photograph and video-capturing cameras, temperature sensors, pressure sensors, humidity sensors, audio sensors, and/or the like. Such sensor devices can be deployed in relatively large numbers and in a variety of systems and environments.

The above information disclosed in this Background section is only for enhancement of understanding of the background of the disclosure and therefore it may contain information that does not constitute prior art.

SUMMARY

Various embodiments described herein include systems, methods, and apparatuses that are generally directed to collecting data from one or more sensors and efficiently storing the data, making the data available to users of that sensor data (e.g., via applications on a host).

In some embodiments, a method is described. The method can include: determining, using a discovery service, one or more parameters associated with a storage device via a network over a medium; transmitting data from at least one sensor to a storage device via the network over the medium; processing the data and storing at least a portion of the data at the storage device; and transmitting at least a second portion of the data via the network to at least one host.

In some embodiments, the storage device can include one or more namespaces, and the method can further include specifying, by the sensor, a namespace of the one or more namespaces for the storing the at least a portion of the data. In other embodiments, the at least one host can include a first host and a second host, and the method can include transmitting, via a controller of the storage device, at least one command associated with the data to the first host or the second host. In some embodiments, the at least one sensor can include a first sensor and a second sensor, the data can include first data associated with the first sensor and second data associated with the second sensor, and the processing of the data can include aggregating the first data and the second data. In other embodiments, the medium can at least partially include a) a wired medium or b) a wireless medium.

In some embodiments, the storage device can include at least one of 1) a namespace or 2) a stream, and the method further comprises specifying, by the sensor, the namespace or the stream for the storing the at least a portion of the data. Further, the method can further include: determining that the portion of the data is stored at the storage device, determining that a size associated with the portion of the data exceeds a threshold, and transmitting an asynchronous notification to the host based on the determination of the size exceeding the threshold. In other embodiments, the asynchronous notification can include at least one of a data offset information, a data location information, or a data length information.

In some embodiments, the sensor is in a first location and the storage device is in a second location, and the first location and the second location are geographically separated by a predetermined distance. In other embodiments, the data can include at least one of a temperature data, a pressure data, a water quality data, a proximity data, a chemical data, a motion data, an electromagnetic field data, a humidity data, a photo file, a video file, or an audio file. In some embodiments, at least one of a) the sensor can include a non-volatile-memory-express over fabric (NVMe-oF) enabled sensor or b) the storage device can include an Ethernet-enabled solid-state drive. In other embodiments, the sensor is configured to transmit the data using an Ethernet protocol, a remote data memory access (RDMA) protocol, an Internet Wide Area RDMA Protocol (iWARP), a Transmission Control Protocol/Internet Protocol (TCP/IP), an RDMA over Converged Ethernet (RoCE) protocol, an InfiniBand protocol, a fifth generation (5G) wireless protocol, a Wi-Fi protocol, a Bluetooth protocol, or a Bluetooth low energy (BLE) protocol. In some embodiments, the storage device can include at least one of a field-programmable gate array (FPGA), an application-specific integrated circuit (ASIC), or any suitable processor to process the data. In other embodiments, the processing of the data can include at least one of a filtering operation, a sorting operation, or a search operation.

In various embodiments, a storage device is described. The storage device can include: at least one memory device that stores computer-executable instructions; and at least one processor configured to access the memory device, wherein the processor is configured to execute the computer-executable instructions to: receive data from at least one sensor to the storage device via a network over a medium; process the data and store at least a portion of the data at the storage device; and transmit at least a second portion of the data via the network to at least one host.

In some embodiments, the storage device can include one or more namespaces, and the method further can include specifying, by the sensor, a namespace of the one or more namespaces for the storing the at least a portion of the data. In some embodiments, the at least one host can include a first host and a second host, and the method can include transmitting, via a controller of the storage device, at least one command associated with the data to the first host or the second host. In some embodiments, the at least one sensor can include a first sensor and a second sensor, the data can include first data associated with the first sensor and second data associated with the second sensor, and the processing of the data can include aggregating the first data and the second data. In some embodiments, the medium can at least partially include a) a wired medium or b) a wireless medium. In some embodiments, the sensor is in a first location and the storage device is in a second location, and the first location and the second location are geographically separated by a predetermined distance. In some embodiments, the data can include at least one of a temperature data, a pressure data, a water quality data, a proximity data, a chemical data, a motion data, an electromagnetic field data, a humidity data, a photo file, a video file, or an audio file. In some embodiments, at least one of a) the sensor can include an NVMe-oF enabled sensor or b) the storage device can include an Ethernet-enabled solid-state drive.

In some embodiments, a system is described. The system can include: a storage device, at least one sensor, and at least one host. Further, the storage device can include at least one memory device that stores computer-executable instructions, and at least one processor configured to access the memory device, wherein the processor is configured to execute the computer-executable instructions to: receive data from at least one sensor to the storage device via a network over a medium; process the data and store at least a portion of the data at the storage device; and transmit at least a second portion of the data via the network to the at least one host.

Accordingly, some-example embodiments of the subject matter described herein can be implemented so as to realize one or more of the following advantages: reduce network latencies and improve network stability and operational data transfer rates and, in turn, improve the user experience; and reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices.

BRIEF DESCRIPTION OF THE DRAWINGS

The above-mentioned aspects and other aspects of the present techniques will be better understood when the present application is read in view of the following figures in which like numbers indicate similar or identical elements:

FIG. 15 shows a diagram of a method for example operations of a system including the sensors and storage devices variously described herein in the context of the sensor-based storage architecture, in accordance with example embodiments of the disclosure.

Figure 1:
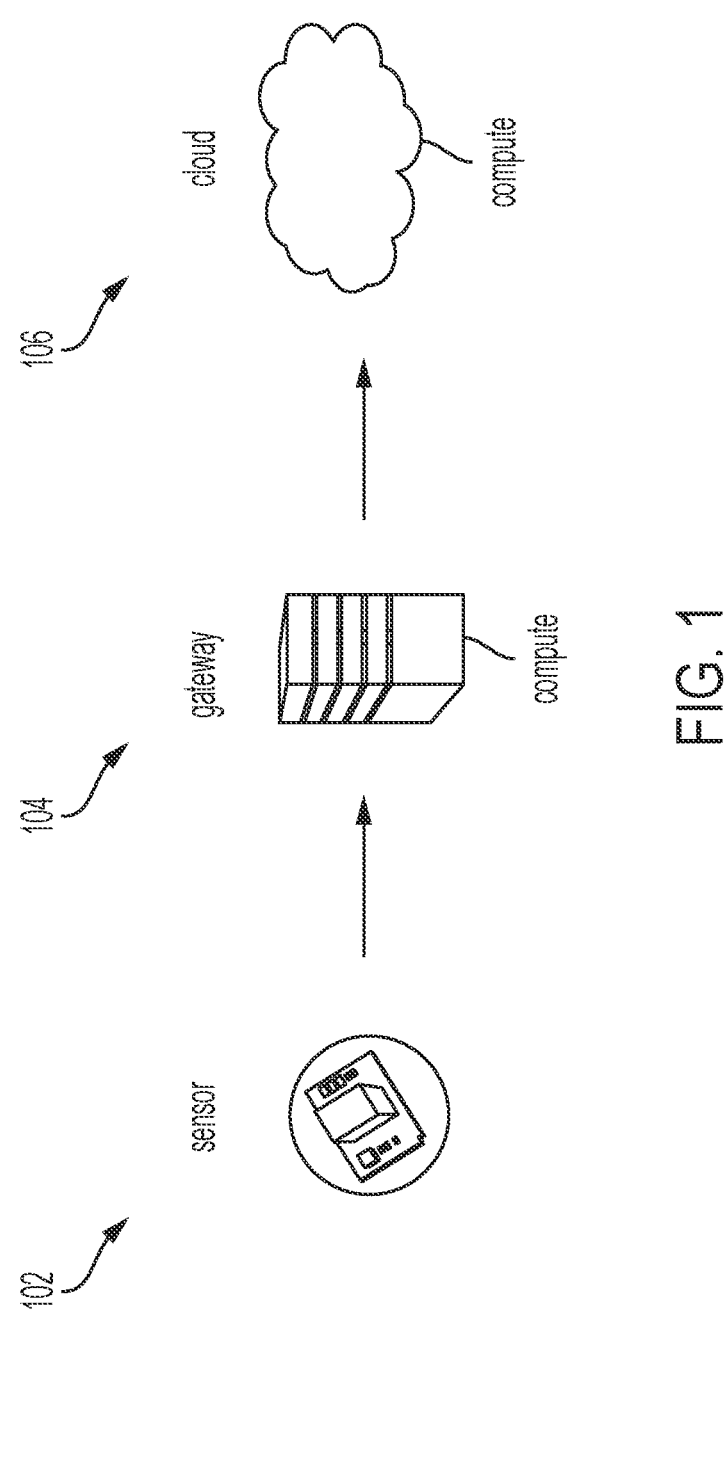
FIG. 1 shows a diagram illustrating a data flow for sensors in a network environment, in accordance with example embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used interchangeably herein). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD)), solid-state card (SSC), solid-state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Increasingly, sensors are being used in a variety of applications to gather environmental data. For example, sensors can be used in autonomous vehicles, where dozens of sensors spread throughout the vehicle capture a variety of environmental and vehicle data and feed that data into one or more control systems for performing many operations, for example, to determine a driving route of an autonomous vehicle. In further examples, a fleet of autonomous vehicles can update, via sensors, relevant vehicle data such as vehicle location, vehicle health status, and driving decisions. Such vehicle data can then be used by a fleet management software for management and to perform fleet operational functions. As another example, seismic sensors can be used to provide seismic data for earthquake detection as well as monitoring weapons testing. Sensors can further be used to monitor a location for security purposes. The video recorded can be continuously fed into a monitoring system to detect abnormal situations. In the above-described example use cases, sensors can be configured to collect and transmit relatively large amounts of data. Therefore, what are needed are systems, methods, and apparatuses for increasing the storage and processing efficiency of such sensor-generated data.

The disclosed systems and methods are generally directed to improving the efficiency of collecting data from one or more sensors, storing the data, and making the data available to users of the sensor data (e.g., via applications on a host). In some embodiments, data collection via multiple sensors can serve to increase the amount of data exponentially with additional computational (e.g., processor) requirements. Moreover, as further shown and described in connection with FIG. 1, the transmission of the sensor data may face intermediate gateways for intermediate routing and/or processing, adding latency, for example, during protocol translations and the like. Moreover, the transmission of relatively large quantities of data over large distances can increase energy and power consumption by the underlying supporting devices.

In some embodiments, the disclosed systems can use various networked protocols, including, but not limited to, a non-volatile-memory-express over fabric (NVMe-oF) and/or an Ethernet protocol, to provide the connectivity and networking infrastructure between the sensors, storage devices, and hosts. In some embodiments, sensor data can be pre-processed or filtered by the storage device (e.g., via a processor, FPGA, and/or the like associated with the storage device) before transmitting the data to one or more hosts to further improve the processing efficiency of the data.

In various embodiments, the disclosed systems can enable the transfer of data from sensors to the storage devices directly without going through additional processors (e.g., central processing units, CPUs), for example, by using the NVMe-oF protocol. Further, a controller of the storage device can serve to monitor the data deposition process, and can be configured to send data deposition reports to a compute CPU of a host, for example, in an asynchronous manner. Additionally, the storage device can be configured to perform data processing on the deposited data before providing a corresponding notification to the compute CPU of the host.

In various embodiments, the sensors and the storage devices containing the persistent data may be geographically located at any distance from one another (e.g., from a few feet or meters to several kilometers or more). Further, the sensors can be configured to independently capture and collect data, and the data may be processed, analyzed, compressed, and archived for further usage.

As noted, the sensors can be configured to implement an NVMe-oF protocol. Accordingly, in some aspects, the sensors can serve as a remote host to the storage devices. Moreover, the storage devices can include one or more NVMe controllers to support multiple hosts. In one embodiment, the storage devices can communicate data availability asynchronously to the compute hosts, and can transmit the data accordingly. While this disclosure primarily describes embodiments used in connection with NVMe-oF and NVMe as one option and/or example of the storage protocol used between sensor host and storage device, the embodiments described herein are also at least in part applicable to any suitable current or storage protocols.

In further examples, the NVMe-oF enabled sensors can implement a controller and service methodology for storage-device discovery. For instance, the sensor can query a predetermined discovery address corresponding to a storage controller associated with the storage device. The discovery service can notify the NVMe-oF enabled storage device about sensor requirements for storage. Accordingly, the sensor can directly connect to a remote network-attached NVMe-oF enabled storage device. In some embodiments, the sensors can utilize one or more namespaces on the storage device, which are further shown and described in connection with FIG. 5.

In some embodiments, the sensor can be configured to compress data and transmit compressed data to the storage device, while the storage device can be configured to decompress the data as needed. As noted, the storage device can perform data processing before the compute host is notified of the availability of the data for processing by the compute host. Moreover, the storage device can provide a namespace as a virtualized file associated with the sensor data to the one or more compute hosts.

As noted, sensors can have a wide variety of use cases and deployment scenarios. In some aspects of the disclosure, sensors may be configured broadly to have two types of connectivity. For example, FIG. 1 depicts a diagram 100 illustrating a data flow for sensors used in a general network environment, in accordance with example embodiments of the disclosure. In a first deployment scenario, sensors such as sensor 102 can be connected to a compute processor (not shown) that reads the sensor data and then sends the data over a network to a sensor gateway 104. In a second deployment scenario, the sensors such as sensor 102 may have additional hardware that converts data to a digital stream and transfers the digitized data over a network to the sensor gateway 104 for additional processing or collection. Accordingly, the gateway 104 may reorganize the data and send it over a network to a larger compute setup to process the data. There may be various endpoints on the network in such a configuration, each of which potentially requiring additional compute and storage resources that may add to the overall latency of data processing and storage. In some examples, the data can undergo a final compute that is implemented on a cloud 106 environment based on the available infrastructure. To mitigate latencies in the sensor's data path, an edge compute (not shown) can at least partially process the data before forwarding to the cloud 106. However, the processing by the edge compute can have related latencies and may require additional hardware. In some aspects, such a latency issue can be mitigated by performing at least some functions of the cloud compute directly at the edge network. However, even if the edge computing mitigates the latencies to some extent, such edge computing may not address the additional compute and processing requirements of the network to process the sensor data. With the possibility of satellite-based network connectivity at a global scale with lower latencies, the transfer of sensor data can grow rapidly and cover vast distances creating compute datacenters in unexplored and undeveloped areas, for example, due to energy and cost efficiency issues. Accordingly, the disclosed systems can serve to mitigate at least some of the processing and storage latencies associated with collecting relatively large quantities of data from one or more sensors that transmit their respective data from locations remote from a central core network (e.g., cloud) or an edge network.

In some embodiments, the disclosed embodiments can include sensors that can directly communicate (e.g., without the intervention of secondary devices) with storage devices such as a solid-state device (SSD) to mitigate some of the compute-based latencies at various intermediate network hops and/or latencies due to adherence to various requirements of gateways, relays, and/or the like in the sensors' data path. In some embodiments, the sensors and storage devices can be located spatially apart at different geographic locations (e.g., at a distance greater than a predetermined threshold).

In various embodiments, the sensors deployed in a given environment may be configured to independently capture data. Such data can then be processed, stored, aggregated, filtered, analyzed, and/or the like, and may be archived for future usage. In some aspects, data generated by the sensor can be received by a processor associated with a storage device and can be stored in the persistent storage device. When the number of sensors and the amount of captured data increases exponentially, the CPU resources required for the processing of such relatively large amounts of data may become both computationally and energetically costly. As noted, embodiments of the disclosure include a system architecture that can reduce or eliminate the CPU resource need and incurred latencies.

The disclosed systems can include sensors using any suitable device-interface specifications and/or protocols, including, but not limited to, a non-volatile memory over fabric (NVMe-oF) protocol, to directly communicate with storage devices such as SSDs. In some examples, the NVMe-oF protocol can be carried over any suitable transport protocol, including, but not limited to, wired protocols such as Ethernet, remote direct memory access (RDMA), iWARP, transmission control protocol/Internet protocol (TCP/IP), RDMA over converged Ethernet (RoCE), RoCE version 2 (or any suitable version), Infiniband, combinations thereof, and/or the like. Further, the NVMe-oF protocol can be carried over a variety of transport protocols, including, but not limited to, wireless protocols such as 3G, 4G, 5G, Wi-Fi, Bluetooth, Bluetooth low energy (BLE), combinations thereof, and/or the like. In various respects, the disclosed systems can be agnostic to the underlying network transport protocol being used and can be configured to operate using any suitable network protocol.

In some embodiments, the sensors can connect with the storage device (e.g., SSD) and can deposit collected data into a specified, dedicated namespace on the storage device. In some embodiments, the storage device can be configured to monitor the deposition of the sensor data in one or more dedicated namespaces and can notify one or more hosts accordingly (e.g., by transmitting a corresponding message to be shown and described in connection with FIGS. 6 and 7). A storage device and host can use asynchronous event notification commands that are pre-issued by the host and completed by the SSD after data is deposited by a sensor. Further, the host can then perform data analysis and processing functions based on the application needs running on the host and/or associated devices.

As noted, the disclosed systems and corresponding system architecture can serve to reduce CPU resource usage requirements, and can therefore be used to process relatively larger amounts of sensor data in comparison with techniques not employing one or more of the disclosed embodiments. The disclosed systems can further reduce latencies associated with applications using such data communication and/or processing latencies associated with the devices on a corresponding network.

Figure 2:
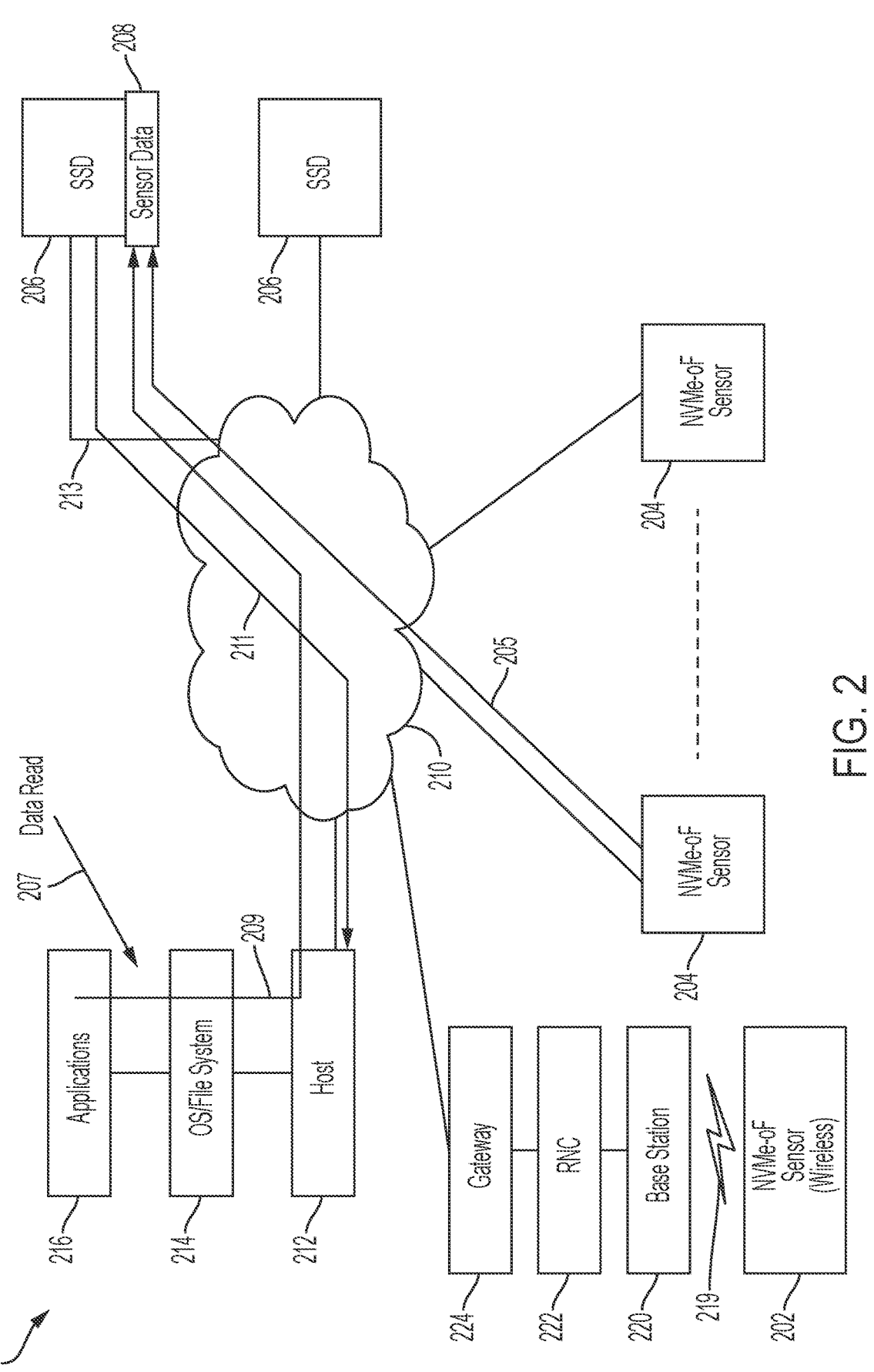
FIG. 2 shows a diagram of an example system architecture for storage-efficient sensors in a networked environment, in accordance with example embodiments of the disclosure.

FIG. 2 shows a diagram of an example system architecture for storage-efficient sensors in a networked environment, in accordance with example embodiments of the disclosure. For example, FIG. 2 shows a diagram 200 including an example wireless sensor 202 (e.g., an NVMe-oF enabled wireless sensor), example wired sensors 204 (e.g., NVMe-oF enabled wired sensors), a first connective path 205 over network 210 between the sensors, and a storage device (e.g., SSD) 206 through which the sensors can deposit data 208 to the storage device 206. Diagram 200 further shows a host 212 communicatively coupled to the storage device 206. The host 212 can include an operating/file system 214 that can be configured to manage or run one or more applications 216. Further, the host can include a host CPU or other processing capability (not shown). The application 216 can generate commands (e.g., a data read command) 207, which can be transmitted over a second connective path 209 to the SSD 206 in order to, for example, read data 208 stored on the SSD 206, the data being previously at least partially deposited on the SSD 206 by a sensor. In some examples, storage devices 206 and/or the host 212 can be connected to the network 210 via an Ethernet connection 213 (or any other suitable connection). In some examples, the SSD 206 can communicate with the host 212 via a third connective path 211, for example, to send a notification (e.g., a data received notification upon receiving data from the sensors 202 or 204).

In some examples, the wireless sensor 202 can communicate over a wireless network 219 (e.g., Wi-Fi, Bluetooth, cellular, 5G, etc.) to a base station 220 or similar entity. The base station 220 can be configured to communicate to a radio network controller (RNC) 222 (or similar entity) and a gateway 224 to transmit data over the network 210 to and from the SSDs 206.

As noted, in an embodiment, a sensor (e.g., sensor 202 or 204) can be configured to directly communicate with a storage device 206, even if the sensors and storage devices are located at relatively distant geographical locations. The sensors can be configured to independently capture and collect data from their respective environments. For example, the sensor can be a field sensor collecting water pressure data and deployed in an oceanic offshore environment, while the storage device can be located onshore in a secure office. In some embodiments, the data generated by the sensor may need to be processed and/or persistently stored at the storage device 206. The data captured by the sensor may include measurements of various physical parameters in the sensor's environment, or the sensor data can include recoding of events as they happen, or both. Some non-limiting examples of sensor data include a temperature data, a pressure data, a water quality data, a proximity data, a chemical data, a motion data, an electromagnetic field data, a humidity data, a photo file, a video file, an audio file, combinations thereof, and/or the like. The disclosed systems can operate using a variety of different types of sensors measuring different environmental properties. Further, the disclosed systems can operate on a variety of different data types. Accordingly, the disclosed systems are generally agnostic to the sensor type or type of data being captured.

In some aspects, the sensors (e.g., sensor 202 or 204) can pass the data to a processor (not shown), which can in turn store the data in the storage devices (e.g., SSDs). However, when the number of sensors and the amount of captured data increases exponentially, the processor resources required for the processing of such large quantities of data can become computationally and energetically costly. Further, additional latencies can be introduced between various intermediate nodes between sensors and processors due to the additional compute in addition to processing and/or data transport. As noted, the energy consumed can increase due to additional compute needs. Thus, the disclosed system architecture of diagram 200 can serve to reduce or eliminate such processing resources.

In some embodiments, a sensor (e.g., sensor 202 or 204) can capture data and may perform one or more pre-processing operations (e.g., filtering, up-sampling, down-sampling, noise removal, combinations thereof, and/or the like) on the data before sending out the data over the network 210. Further, the disclosed systems can operate with a sensor (e.g., sensor 202 or 204) that can postpone data transmission until a predetermined amount of data is captured and buffered prior to transmission over the network 210, or the disclosed systems may operate with a sensor that sends the data over the network 210 relatively quickly (e.g., with a delay that is below a predetermined amount). Accordingly, the sensor may send data continuously (e.g., stream data), or it may send data in predetermined units (e.g., chunk sizes). Regardless of the mode of operation (continuous or buffered), when the sensor is ready for sending out the captured data, the sensor can establish a connection with the specified storage device (e.g., storage device 206) and then transmit captured data 208 over the network 210 to the storage device.

In some embodiments, the sensor (e.g., sensor 202 or 204) can establish an NVMe-oF connection or association with a storage device (e.g., storage device 206 including an SSD). As noted, the NVMe-oF protocol can be carried over a variety of transport protocols, such as wired protocols like Ethernet, RDMA, iWARP, TCP/IP, RoCE, RoCEv2, Infiniband, combinations thereof, and/or the like, and/or wireless protocols such as 5G, Wi-Fi, Bluetooth, BLE, combinations thereof, and/or the like. It will be understood that, while embodiments of the disclosed systems can be used with the protocols described above, embodiments can be agnostic to the network transport protocol being used.

In one embodiment, the transport and network parameters used by the storage device (e.g., storage device 206) may be determined and pre-configured in association with communications between the storage device and the sensor (e.g., sensor 202 or 204) or may be configured at the sensor itself. In another embodiment, the sensor may use a discovery service to obtain the transport network details of the storage device to be used. For example, the discovery service may be performed at least in part by a controller (e.g., an NVMe-enabled controller) within or in communication with the storage device that operates with sensors and sensor data-based compute hosts, as further shown and described in connection with FIG. 5, below.

In some embodiments, the disclosed systems may operate with any suitable implementation of the controller, and the implementations may vary based on the transport parameters. As noted, the sensors (e.g., sensor 202 or 204) may use the NVMe-oF protocol to communicate with the storage devices (e.g., storage device 206). Accordingly, a sensor can serve as a host communicating with the storage device that stores the captured data. When the connection is established, the sensor can communicate with the controller present in the storage device to persist the captured data. As further shown and described in connection with FIGS. 4 and 5, after initial configuration and initialization, the sensor may send an NVMe Write command with a specific namespace identifier. In another embodiment, the sensor may write the data using an NVMe Streams feature. In some aspects, such a Streams feature can serve to enable a host to indicate to the controller that specified logical blocks in a write command are part of one group of associated data. Further, as used herein, the streams can reference an NVMe-based stream or a stream using any other suitable protocol (e.g., storage-based protocol or networking protocol). Thus, the captured data can be written to a specific location (e.g., logical block addresses, LBAs) in the storage device's flash media. In other examples, the storage device can send a completion entry with a completion status back to the sensor, as further shown and described in connection with FIG. 7 below. After transferring a given portion of data, the sensor may determine to transfer more data, or break the connection for a predetermined duration, or maintain the connection as active for future data transfer. Such a determination may be performed based on a predetermined policy that is based on one or more factors, including, but not limited to, network availability, bandwidth usage, available storage on the storage devices, priority of the data, Service Level Agreement (SLA), quality of service (QoS) requirement, combinations thereof, and/or the like.

In various embodiments, the disclosed systems can be configured such that a storage device's controller (not shown) can be configured to implement one or more additional features for facilitating efficient sensor data storage and processing. For example, one of the features supported by the storage device controller can include supporting multiple NVMe controllers as further shown and described in connection with FIG. 5, below. For example, the storage device 206 can be configured to support multiple NVMe controllers for communicating with multiple hosts (e.g., similar, but not necessarily identical, to the host 212). In some aspects, the hosts can be associated with the sensors (e.g., sensors 202 and 204) depositing data into a given storage device, such as the storage device 206. Further, the host 212 can include compute processors that can be in charge of the processing and analyzing of the captured data retrieved from the storage device 206. In some respects, as the sensors (e.g., sensors 202 and 204) deposit captured data into a specified namespace or stream of a storage device 206, the storage device's controller can monitor and track the data deposition process. For example, the storage device's controller can track data being written to the storage device 206. The storage device's controller can then use an asynchronous notification to report to a host 212 that data is available for processing and enable a compute processor of the host 212 to perform data processing and analysis. A compute processor (not shown) of the host 212 can, in various embodiments, host, issue, and maintain data deposited report commands outstanding with the storage device's controller. Such commands can include any suitable vendor commands, such as vendor-defined NVMe commands, which can be used by the compute hosts to obtain data-deposited notifications asynchronously from the storage device.

In some embodiments, outstanding commands such as the vendor-defined commands can be completed or executed by the storage device's controller when a specified sensor 206 deposits data into a specified namespace or stream of the storage device 206. In another embodiment, the storage device's controller can be configured to send the asynchronous notification to the host 212 after a certain amount of data is deposited in the storage device 206. In yet another embodiment, the storage device's controller can transmit asynchronous notifications to the host 212 based on various parameters and policies, including, but not limited to, a time, a date, a host ID, a namespace identifier (NSID), a stream identifier, a medium access control (MAC) ID, various TCP/IP, storage and network parameters, combinations thereof, and/or the like. In some embodiments, a policy describing how to transmit notifications can be set by a storage management related device (e.g., a baseboard management component (BMC) device associated with a chassis of storage devices, not shown) under storage administrator guidance, or the policy can be pre-configured in the storage device 206. In another embodiment, the storage device's controller may send the asynchronous notifications to the host 212 based on received data from a service on a discovery controller component (not shown), which can in turn distribute the information to listening compute hosts (not shown) on the host 212.

As noted, in various embodiments, the sensors (e.g., sensor 202 and/or 204) can be configured to measure one or more environmental physical parameters, including, but not limited to, temperature, pressure, humidity, and/or the like. In some examples, the sensors may monitor events, patterns, and/or sequences of events. For example, some sensors (such as sensors including cameras) may provide visual data. In another example, some sensors (such as sensors including microphones) may collect audio data. Accordingly, the sensors can include a broad range of device types suitable for a variety of different applications, some of which are shown and described in connection with FIGS. 8-11.

Accordingly, the sensors (e.g., sensor 202 or 204) can include any suitable device that collects some form of data that it provides for further processing and analysis. In other words, sensors can be configured to collect data that is to be consumed (e.g., stored and/or processed) by compute devices and/or storage devices. Thus, in some examples, the sensors may be communicatively connected to the compute and/or data storage devices by any suitable technique. In some embodiments, the sensors can be connected through any suitable network, including, but not limited to, a network, such as a Local Area Network (LAN), a Wide Area Network (WAN), and/or the like. In another aspect, the sensor can be configured to use a wireless network (e.g., via an antenna) or a wired connection to connect to the network.

Figure 3:
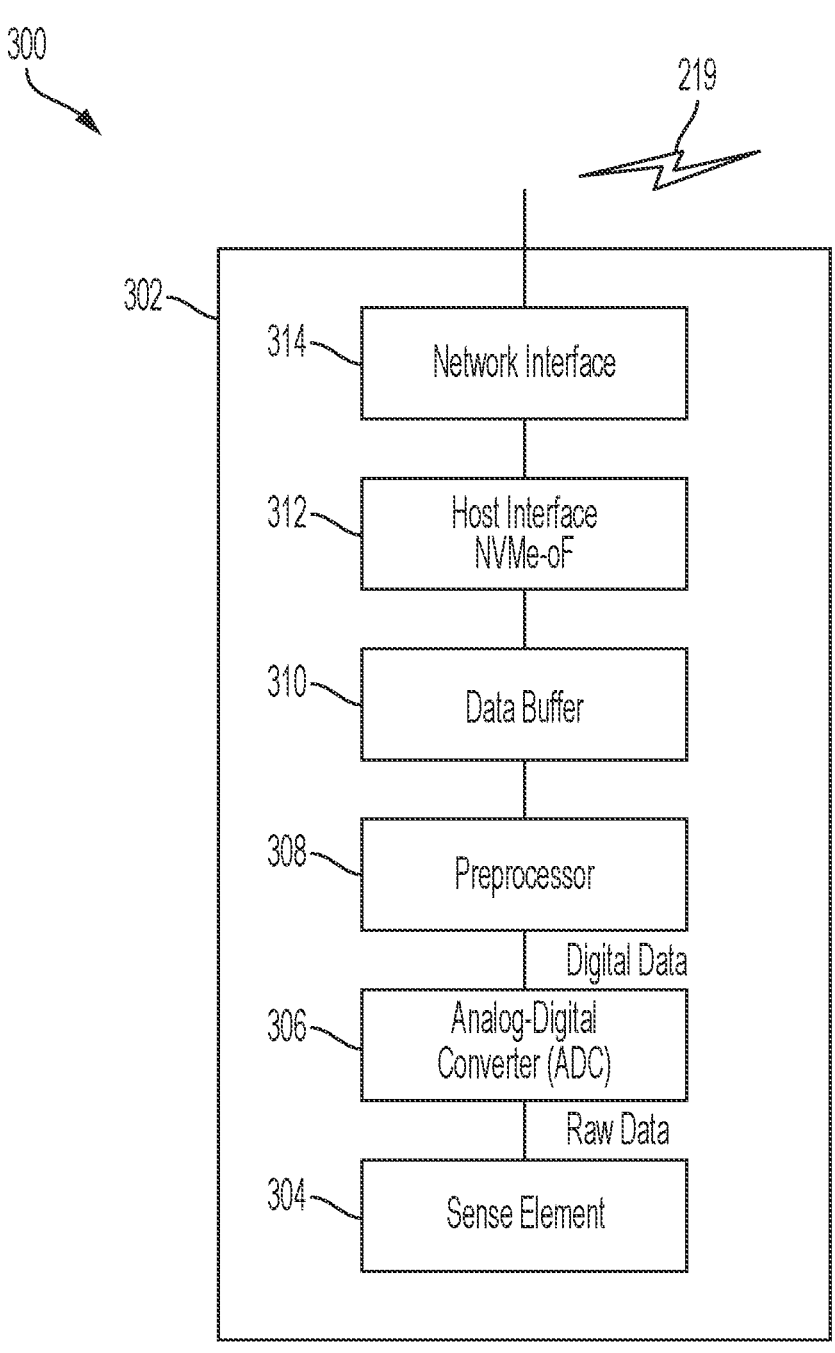
FIG. 3 shows a diagram of an example sensor architecture for use in connection with the disclosed systems, in accordance with example embodiments of the disclosure.

FIG. 3 shows a diagram 300 of an example sensor for use in connection with the disclosed systems, in accordance with example embodiments of the disclosure. For example, FIG. 3 shows a diagram 300 of an example architecture of a sensor 302 including an interface (e.g., logic and/or circuitry) for communicating using an NVMe-oF protocol, labeled as host interface NVMe-oF 312. FIG. 3 shows a diagram 300 including further details of the sensor 302 (e.g., similar, but not necessarily identical, to the wireless sensor 202 or wired sensors 204 shown and described in connection with FIG. 2 above). In some embodiments, the sensor 302 can include, but is not limited to including, a sense element 304, an analog-to-digital converter (ADC) 306, a preprocessor 308, a data buffer 310, a host interface 312, and a network interface 314. Further, in the case of a sensor 302 that communicates wirelessly, the sensor 302 can transmit wireless signals 219, for example, using corresponding circuitry in the network interface 314 (details not shown), in order to transmit data to a storage device.

In some embodiments, the sense element 304 in the sensor 302 can be configured to measure or capture data from a real-world environment. For example, the sense element 304 can be configured to produce an analog signal that corresponds to the real-world environmental parameter(s) being sensed. In some embodiments, the captured data can include analog raw data that can then be converted to digital format, for example, using an analog-to-digital convertor (ADC) 306. In some embodiments, a preprocessor 308 can be used to process the raw data for various functions, including, but not limited to, filtering, scaling, normalization, noise removal, and/or the like. The preprocessed data can be stored in a data buffer 310. The host interface (e.g., the host interface NVMe-oF 312) can be configured to establish a connection with a specified storage device over a network (e.g., an Ethernet-based network such as the network 210 as further shown and described in connection with FIG. 2, above) via the network interface 314. In some embodiments, the sensor 302 may use any suitable discovery service to determine specific information associated with one or more storage devices (e.g., SSD(s) that it communicates with).

Once the connection is established, the sensor 302 may send commands (e.g., NVMe-based Write commands) to send data to the storage device (e.g., the SSD 206 shown and described in connection with FIG. 2, above). The sensor 302 can thereby serve as a remote host to the storage device. In some embodiments, the storage device 206 can be configured to send a completion entry associated with the sent command (e.g., the NVMe Write command) to the sensor

302. Accordingly, the sensor 302 can be configured to discard that data from the data buffer 310 based on the reception of the completion entry. In various embodiments, a frequency of data deposition by the sensor 302 to the storage device(s) may be pre-configured, for example, based on a predetermined rule, and/or set by a user. The frequency can be dynamic or static within a given time period, and can be determined by numerous factors, individually or in combination, such as the rate of data generation by the sensor 302, the bandwidth of the connection available between the sensor 302 and the storage device(s), the time of day, a tag associated with the data representative of the importance of the data, and/or the like. In some embodiments, the sensor 302, and/or a device configured to communicate with the sensor, can compress the data using any suitable algorithm to increase the transmission efficiency by the sensor. In some embodiments, the compression of data may involve additional circuitry (e.g., a compression module, not shown) that can be connected to the data buffer 310. Further, the storage device, and/or a device (e.g., processor, FPGA, ASIC) within the storage device or configured to communicate with the storage device, can decompress the data using any suitable algorithm upon reception by the storage device.

In various aspects, as noted, the sensor 302 can use an NVMe-oF protocol to send data over an underlying network (e.g., similar, but not necessarily identical, to the network 210 shown and described in connection with FIG. 2). The NVMe-oF protocol can be carried over a variety of transport protocols, including, but not limited to, Ethernet, RDMA, iWARP, TCP/IP, RoCE, RoCEv2, Infiniband, and/or wireless protocols, including, but not limited to, 4G, 5G, Wi-Fi, Bluetooth, BLE, and/or the like. As noted, the disclosed systems and methods can be agnostic to the network transport protocol being used.

Figure 4:
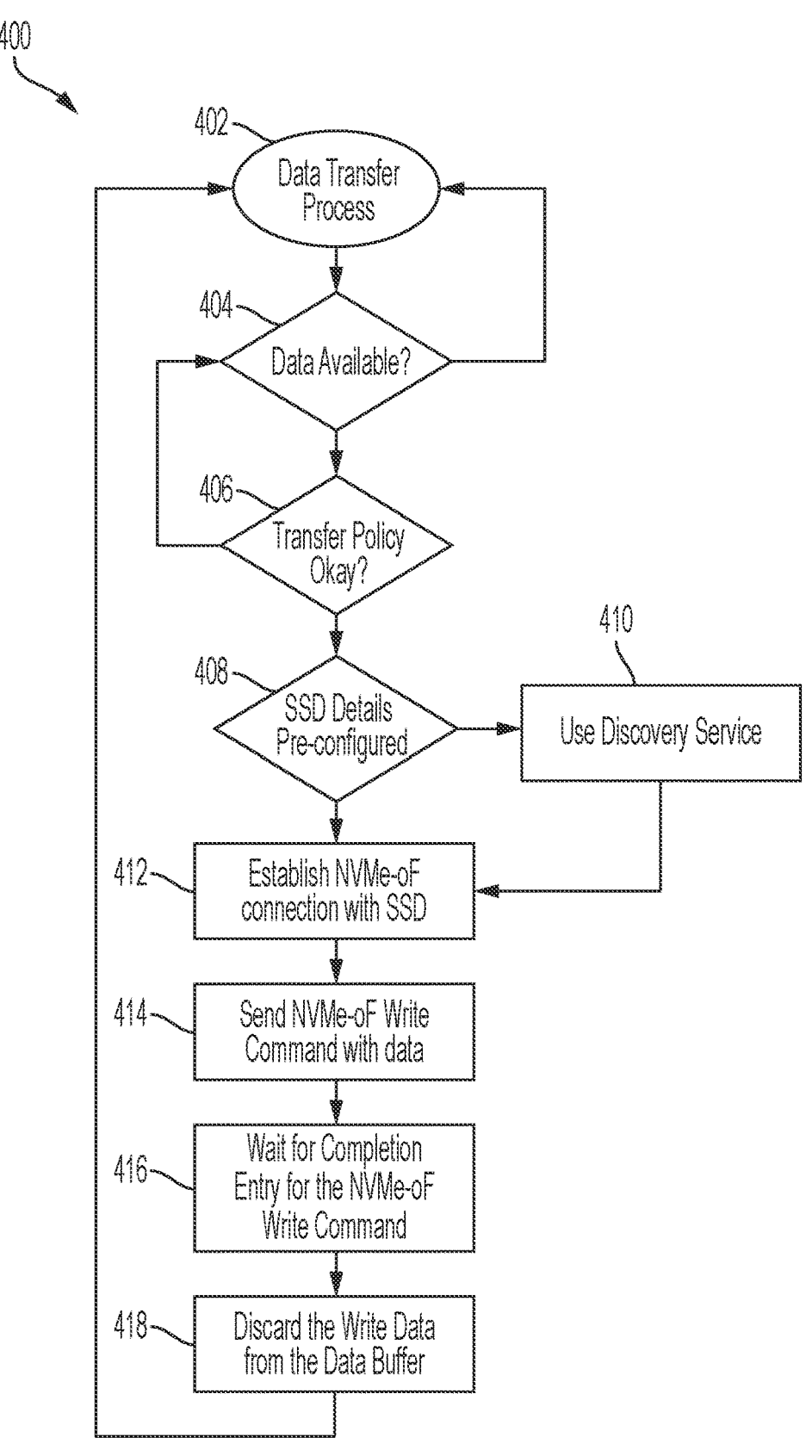
FIG. 4 shows a diagram of an example method that describes certain example sensor operations, in accordance with example embodiments of the disclosure.

FIG. 4 is an illustration of an example method 400 reflecting example sensor operations, in accordance with example embodiments of the disclosure. At block 402, a sensor can begin the data transfer process (e.g., transfer of data from the sensor to a storage device). In some embodiments, the sensor can transfer data based on predetermined rules. For example, the rules may dictate that the sensor begin transferring data when a predetermined amount of data fills the sensor's local buffer, when a network condition is met, when a certain type of data is detected, when a second device provides it with a corresponding instruction, when a user provides it with a corresponding instruction, when a wireless connection to a base station is stronger than a predetermined threshold, at a particular time of day, combinations thereof, and/or the like.

At block 404, the sensor can determine whether data is available (e.g., in a data buffer associated with the sensor or other storage module associated with the sensor). For example, the sensor can run an internal program using any suitable processing element local to the sensor (e.g., via a sensor controller or FPGA, ASIC, or processor) to determine the presence of the data within the memory of the sensor (e.g., at the data buffer). Further, the sensor can determine the type and quantity of data, and may prioritize data of a given type for transmission over another type of data. For example, data associated with certain sensitive measurements associated with a weather condition or an earthquake condition may be prioritized over data that is related to other factors and/or has data components below a given threshold value.

At block 406, the sensor can determine that a data transfer policy exists and is compatible for the sensor and the storage device for the purpose of transferring the data to the storage device. In some embodiments, the data transfer policy can include information associated with the sensor and storage device's capabilities and features (e.g., bandwidth, total storage, network interfaces supported, wireless or wired protocols supported, combinations thereof, and/or the like). In some embodiments, the data transfer policy can be modified and negotiated based on various properties of the system, including, but not limited to, a network condition, the type of data being transmitted, the strength of a network connection, a time of day, combinations thereof, and/or the like. For example, the sensor can provide its data transfer capabilities, and the storage device can provide its data receiving capabilities, and one or more parameters associated with the data transfer can be determined by the devices such that the data transfer is performed in an efficient and/or optimal manner. For example, if the sensor is capable of transmitting data at a first rate and a second rate, where the second rate is greater than the first rate given a particular network condition, and if the storage device is capable of receiving the data at the second rate and a third rate greater than the second rate given that the network condition holds, then the sensor and the storage device can determine to transmit and receive the data at the second rate while the network condition holds.

At block 408, the sensor can determine any suitable pre-configured settings and related information associated with the storage device. In one embodiment, the transport and network parameters used by the storage device may be determined and pre-configured in association with the sensor or on the sensor. As noted, the transport and network parameters may include, but are not limited to including, a network protocol such as an NVMe-oF protocol, a data transfer rate, a data type, various frame features to be included with the data packets being transferred to confer, for example, security for the data, combinations thereof, and/or the like.

At block 410, the sensor can use a discovery service to determine the existence of and/or information associated with the storage device. In some embodiments, the sensor can utilize the discovery service using an NVMe-oF based discovery controller that operates with sensors and sensor data-based compute hosts. In another embodiment, the storage device can have a corresponding discovery controller that also operates with sensors and sensor data-based compute hosts. The disclosed systems may operate with any suitable implementation of the controller, and the implementations may vary based on the transport parameters. Non-limiting examples of information associated with the storage device include a maximum read or write speed, a power usage metric, a device interface, a supported protocol list, a response time, a latency, a throughput, an TOPS rate, or any other suitable performance capability, combinations thereof, and/or the like.

At block 412, the sensor can establish a connection (e.g., a connection in accordance with an NVMe-oF protocol) with the storage device (e.g., SSD) over the network. In some embodiments, the sensor (e.g., sensor 202 or 204) can establish an NVMe-oF connection or association with the specified storage device (e.g., SSD). As noted, the NVMe-oF protocol can be carried over a variety of transport protocols, such as wired protocols like Ethernet, RDMA, iWARP, TCP/IP, RoCE, RoCEv2, Infiniband, combinations thereof, and/or the like, and/or wireless protocols such as 5G, Wi-Fi, Bluetooth, BLE, combinations thereof, and/or the like. The disclosed systems can be agnostic to the network transport protocol being used. In some embodiments, the establishment of the connection can be performed using dedicated data packets that are transmitted between the sensor and the storage device.

At block 414, the sensor can send a command (e.g., an NVMe-oF Write command) with data to the storage device over the network. After initial configuration and initialization as needed, the sensor may send a write command (e.g., an NVMe Write command) to the storage device. In some embodiments, the write command can be transmitted using a specific namespace identifier or a stream identifier. Thus, the captured data can be written to a specific location (e.g., physical blocks) in the storage device's underlying storage medium (e.g., flash medium). In this way, different sensors in the field can be configured to write to the same or different namespaces as specified by the namespace identifier or streams as specified by the stream identifier.

In some respects, as the sensors deposit captured data into their respective specified namespaces, a storage device's controller can monitor and track the data deposition process. For example, the storage device's controller can track data being written to the storage device. The storage device's controller can send an asynchronous notification to a host report that data is available for processing to a compute CPU on the host configured for data processing and analysis. As noted, the compute CPU can, in various embodiments, host, issue, and maintain data deposited report commands outstanding with the storage device's controller. Such commands can include vendor-defined NVMe commands used by the compute hosts to obtain data-deposited notifications asynchronously. These outstanding commands can be completed or executed by the storage device's controller when the specified sensor deposits data into the specified namespace or stream. In another embodiment, the storage device's controller can be configured to send the asynchronous notification after a certain amount of data is deposited. In yet another embodiment, the storage device's controller can transmit asynchronous notifications based on various parameters and policies, such as time, date, host ID, namespace identifier (NSID), stream identifier, medium access control (MAC) ID, TCP/IP, storage and network parameters, combinations thereof, and/or the like.

At block 416, the sensor can wait for and receive a completion entry associated with the completion of the command (e.g., an NVMe-oF Write command) from the storage device. In some embodiments, the completion entry can serve as a record of the transaction between the sensor and the storage device.

At block 418, the sensor can discard transmitted data (e.g., write data) from its data buffer. In some embodiments, this can serve to provide additional buffer capacity for the next round of data collection from the environment prior to transmission at the storage device. After clearing the transmitted data from the data buffer, the sensor may transfer additional data (e.g., after the data buffer fills up), or may break the connection for a predetermined duration, or may maintain the connection as active for future data transfer. Accordingly, if the sensor determines to perform additional data transfer either at the moment or in the future, the sensor can return to the data transfer process state represented at block 402 and run through one or more of the operations shown and described in connection with method 400.

Figure 5:
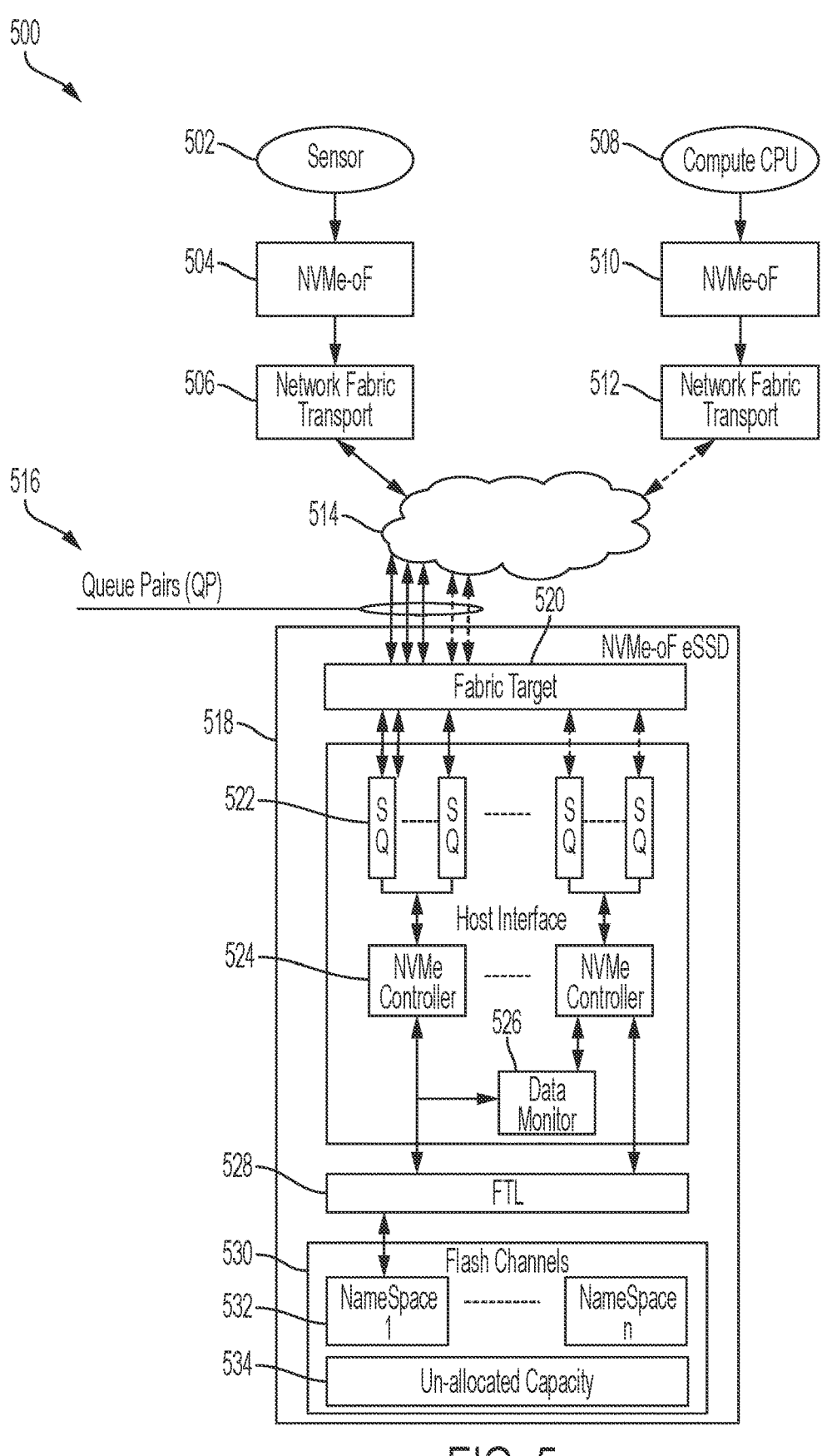
FIG. 5 shows a diagram of an example storage device architecture, in accordance with example embodiments of the disclosure.

FIG. 5 shows a diagram of an example storage device architecture 500, in accordance with example embodiments of the disclosure. In some embodiments, the storage device can include an SSD 518. For example, the SSD 518 can be configured to use flash media for persistent data storage in order to store the data received from the sensor (e.g., sensor 502). The sensor 502 can communicate using a protocol (e.g., NVMe-oF 504) and a network transport fabric 506 over network 514 with SSD 518. The network 514 can transmit information from the sensor to the SSD 518 via queue pairs 516 to a fabric target 520 of the SSD 518. The SSD 518 can communicate to the compute CPU 508 using network 514 and via network fabric transport 512 and a protocol (e.g., NVMe-oF 510). In some embodiments, the SSD 518 can include the following modules: 1) a host interface 521, 2) a flash translation layer (FTL) 528, and 3) flash channels 530 including namespace 532 and unallocated capacity 534 (which can be used to store data and other information such as metadata). These modules together can also be referred to as an SSD Controller. In various embodiments, the storage device architecture can enable the flash media to be made accessible to the host.

The host interface 521 can be configured to provide a logical view of the persistent storage to the attached host at the compute CPU 508. The flash storage capacity may be advertised in the units of logical blocks or sectors, or it could be advertised as object storage. The host may issue, via the compute CPU 508, I/O commands using logical block addresses (LBAs) in case of an SSD configured for block storage, or the host may issue object storage protocol commands, such as key value (KV) commands for storage devices that can handle objects. The host interface 521 can handle network connections from hosts. The host connections can be mapped to a set of command submission queues (SQ) 522 in the SSD 518. The host interface 521 can implement SQ arbitration and quality of service (QoS) policies, and can be configured to perform command selection for execution. In some embodiments, the host interface 521 can also perform data direct memory access (DMA) operations to and/or from host memory (not shown).

In some embodiments, the disclosed systems can include a sensor 502 that can send commands (e.g., write commands) and data (e.g., write data) together to the SSD 518. The compute CPU 508 at the host may issue commands (e.g., read or write commands) while leaving data DMA operations to the SSD 518. In another embodiment, the command selected for execution is handed over to the FTL 528 for further execution.

The FTL 528 can include circuitry to covert logical addresses associated with the memory for storing the data to physical addresses where data is actually stored in the flash media in the flash channels 530. For example, such flash media has certain characteristics (e.g., read and/or write and endurance characteristics) that need to be carefully managed. Accordingly, an SSD controller (not shown) can be configured to manage the flash media so that the flash media can be used to provide reliable, high-performance, and cost-effective data storage capability. In some embodiments, the SSD controller may need to perform one or more internal (e.g., SSD-based) procedures to ensure consistent operation of the SSD 518. Some examples of internal (or background) operations may include, but are not limited to: a data recycling operation, a garbage collection operation, an FTL data structure update operation, a status and/or log update operation, a cache offload operation, and/or the like.

In some embodiments, the FTL 528 can be configured to provide a physical address and/or data in the case of a write command from the host to the flash channels 530. Accordingly, the flash channels 530 can perform data read or write operations to the flash media. The flash channels 530 can implement specific bus protocols needed to access the flash media, and the flash channels 530 may further implement any other related functions associated with the data read or write operations, including, but not limited to, error detection and correction and data compression.

In various aspects, the architecture of the SSD 518 can include one or more controllers (e.g., NVMe controllers) which can be configured to support one or more hosts. In another embodiment, there can be one or more hosts (e.g., hosts similar to the host 212 shown and described in connection with FIG. 2) communicating with a given SSD 518. Further, there can be one or more compute CPU 508 hosts communicating with the SSD 518. Accordingly, the host, sensor 502 and compute CPU 508 can have one or more dedicated NVMe controllers 524 in the SSD 518. Further, the host and the host's associated NVMe controller 524 can include a set of dedicated connections (not shown). Each connection can be configured to connect to and map to an administrator and/or I/O command submission queues 522. In another embodiment, the NVMe controllers 524 can be static or dynamic in nature. Accordingly, the NVMe controllers 524 may or may not persist their state and configuration settings across resets and power cycles. The SSD controller can include logic (e.g., data monitor 526) to monitor data being deposited into the specified namespaces or streams 532 by the sensors 502 and/or hosts. Such monitoring information is then made available to the specified NVMe controllers 524 so that those NVMe controllers 524 can execute various reporting commands (e.g., outstanding data deposit report commands) as appropriate.

In another embodiment, for a data-enabled SSD controller, the controller may provide a service that virtualizes the namespace 532 as a file. Accordingly, the SSD controller can provide byte-level write granularity in certain implementations and can provide an append capability. In some embodiments, the namespace 532 can refer to a file being written to by the sensor 502. Accordingly, the sensor 502 can issue a command (e.g., a write append command) without specifying certain information such as a logical block address (LBA) offset. Accordingly, the controller can include a corresponding namespace service to translate the write to the appropriate LBA offset and append the data to the namespace 532. In some embodiments, the data writes can be supported at a byte granularity (e.g., to have reduced functionality in the sensor 502); accordingly, the SSD controller can cache the data writes to an internal memory write buffer (not shown) and write the data after a specific threshold that satisfies the optimal/minimal write requirements or time for that buffered data is met. In some instances, the SSD controller may use append logic to optimally place data in flash media.

In another embodiment, the SSD controller may provide compute offload services using a processing device (e.g., an FPGA, an ASIC, a core processor, and/or the like). Such services may perform various operations on the data, including, but not limited to, compressing the incoming data to smaller sizes, encrypting the data for security and protection, preprocessing the data into analytical or other databases, combinations thereof, and/or the like. In another embodiment, the offload services and capabilities can be transparent to the sensor host and can include a property setup through the discovery service and compute host(s).

In another embodiment, the data may be received at the SSD 518 as compressed data write commands. The compressed data write commands may then be decompressed and can be processed according to the operations (as applicable) described above.

In some embodiments, the disclosed systems can include a command that can be used to inform compute servers (e.g., servers associated with the host or with the storage device (s)) that a given sensor is available for data transmission and/or processing. In an embodiment, the command can be referred to as a data deposited report command (or any other suitable name) and can have a command structure and/or format that is in accordance with a protocol (e.g., an NVMe command structure and format). In some embodiments, one or more of the fields associated with the command can be repurposed as needed to facilitate data arrival reporting to the hosts asynchronously. That is to say that the execution of the command may not necessarily be predetermined, and that the command can be executed when sensor data is received by the SSD (e.g., the SSD or storage device architecture 500 shown and described in connection with FIG. 5).

Figure 6:
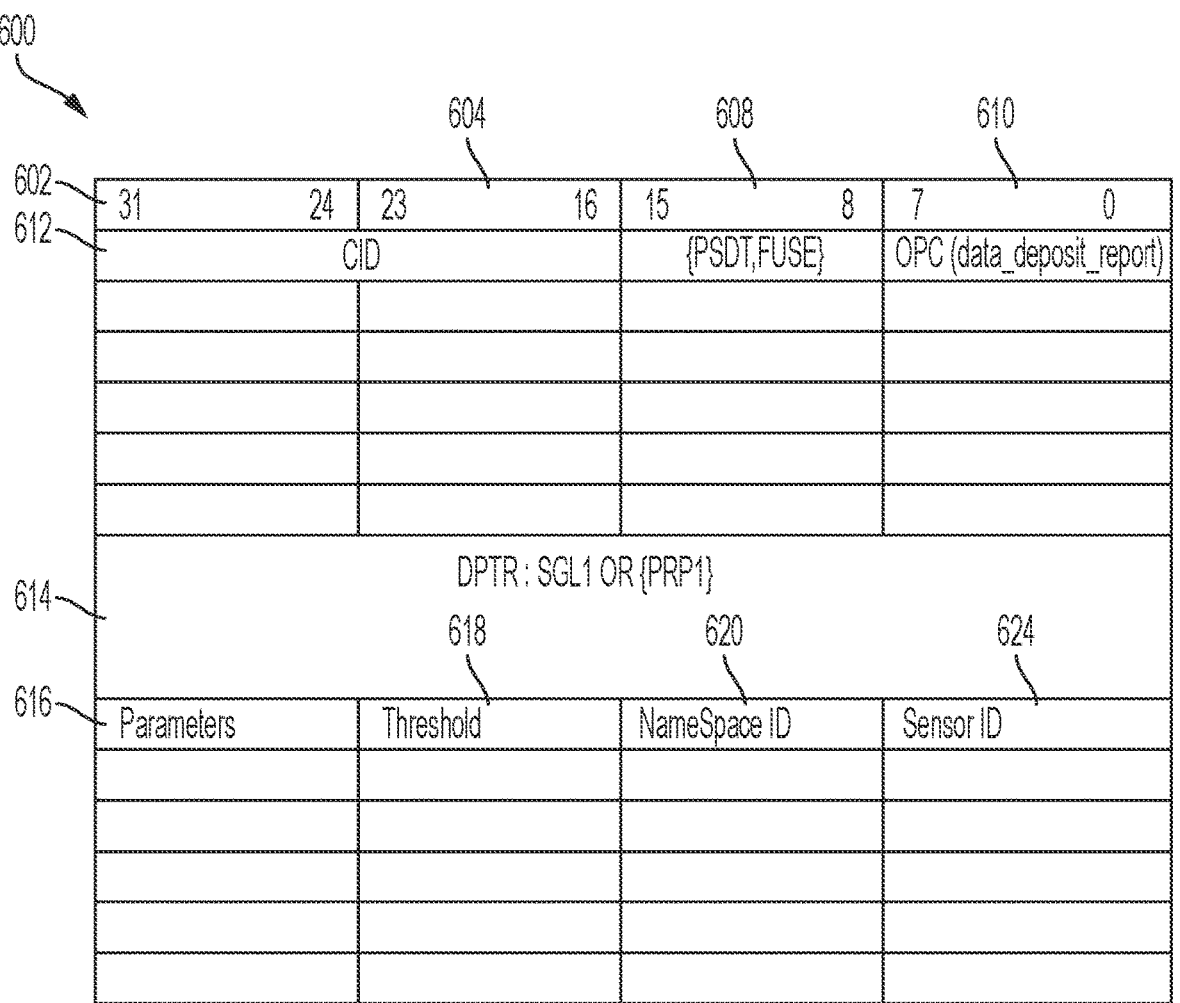
FIG. 6 shows a diagram of an example structure of a data deposited report command for use in connection with the storage-efficient sensors in the networked environment, in accordance with example embodiments of the disclosure.

FIG. 6 is a diagram of an example structure of a data deposited report command 600, in accordance with example embodiments of the disclosure. In some embodiments, the command can be organized by numbers associated with the field to be described, such as example numbers 602, 604, and 608, which correspond to different fields. In some aspects, the command 600 can include a Physical Region Page (PRP) or Scatter Gather List (SGL) for Data Transfer (PSDT) field 608 which specifies whether PRPs or SGLs are used for any data transfer associated with the command. PRPs shall be used for all Admin commands for NVMe over PCIe. In particular, SGLs shall be used for all Admin and I/O commands for NVMe over Fabrics. Further, the command 600 can include a capabilities and/or command ID (CID) field 612, which can include information about the capabilities supported by the devices or the identifier associated with the command. In some examples, the command 600 can include a data pointer (DPTR) field 614 which specifies the data used in the command 600. In an example, the command 600 can include an operation code (OPC) 610 value in the command 600 can be used to indicate that the command 600 is a data deposited report command.

In another embodiment, the sensor ID field 624 can be configured to indicate which sensor data is associated with this command 600. The namespace ID 620 field can specify which namespace or stream, if applicable (e.g., the namespace 532 shown and described in connection with FIG. 5), is to be monitored for reporting (e.g., to the host). In some embodiments, the compute host may also set reporting thresholds 618 and other such parameters 616 in the command 600. In some embodiments, streams can refer to host hints that can serve to indicate data writes associated with one another or data writes that have a similar lifetime. A group of individual data writes can form a collective stream, and each stream can be given a unique identifier. For example, hot data (e.g., data that is used often or is part of a live process) can be assigned a unique stream, and the data associated with the stream ID can be included in the same erase block. In some embodiments, streams can serve many advantages, including, but not limited to, providing better endurance, improved performance, and consistent latency in connection with the disclosed systems. In another embodiment, streams can serve to allow a host to associate each write operation with a stream. In some embodiments, data associated with a stream can be invalidated (e.g., updated, trimmed, unmapped, deallocated) at substantially the same time. In another embodiment, the disclosed systems can use streams to align block allocation based on application data characteristics (e.g., an update frequency).

The compute host (e.g., the compute host using a compute CPU 508 shown and described in connection with FIG. 5) may issue one or more data deposit report commands for the sensors it would like to monitor and may process data collected by those sensors. In some embodiments, a discovery service (e.g., the discovery service described with respect to block 410 shown and described in connection with FIG. 4) may subscribe to an event associated with the issuance of a data deposit report command and can be configured to relay the event to a compute host that is listening for the issuance of such events. In another embodiment, the one or more data deposit report commands can stay outstanding in the SSD until specified reporting condition(s) is/are fulfilled. When the reporting condition(s) are fulfilled, the SSD can be configured to execute or complete a corresponding outstanding one or more data deposit report commands. Further, the SSD controller can be configured to send a completion entry (not shown, see FIG. 7) to complete the command.

Figure 7:
FIG. 7 shows a diagram of an example structure of a completion entry associated with data deposit report commands, in accordance with example embodiments of the disclosure.
Figure 7:
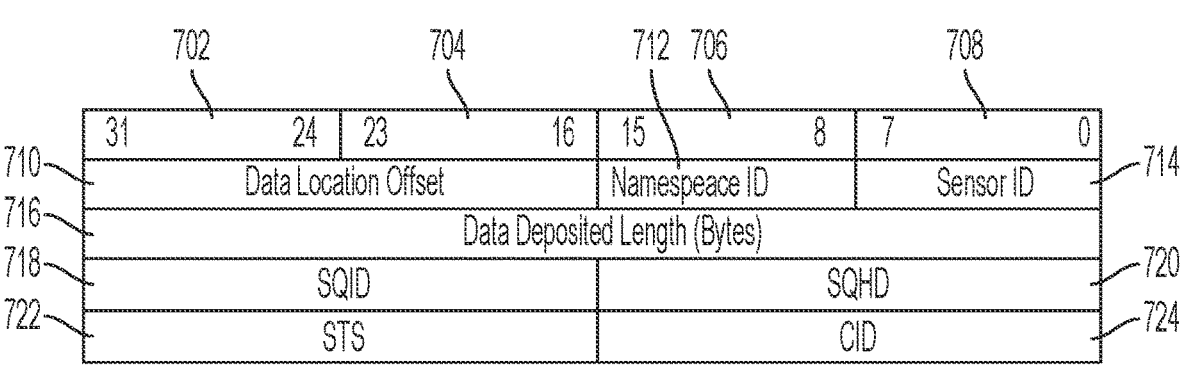

FIG. 7 is a diagram of an example structure of a completion entry 700 associated with data deposit report commands, in accordance with example embodiments of the disclosure. In some embodiments, the command can be organized by numbers associated with the field to be described, such as example numbers 702, 704, and 708, which correspond to different fields. The completion entry 700 can include the sensor identifier 714 as well as the namespace or stream identifier 712 associated with the command. The completion entry 700 can also indicate information regarding an updated data location or offset 710 in the SSD. Finally, the completion entry 700 indicates the amount of data (e.g., via the data deposited length field 716) deposited by the sensor. The completion entry 700 can include a data location offset 710 field, a namespace ID field 706, a submission queue identifier 718 field that indicates the Submission Queue to which the associated command was issued. The completion entry 700 can include a SQ Head Pointer (SQHD) 720 field that indicates the current Submission Queue Head pointer for the Submission Queue indicated in the SQ Identifier field. The completion entry 700 can include a device status (STS) 722 field. The completion entry 700 can include a command ID 724 field.

Figure 8:
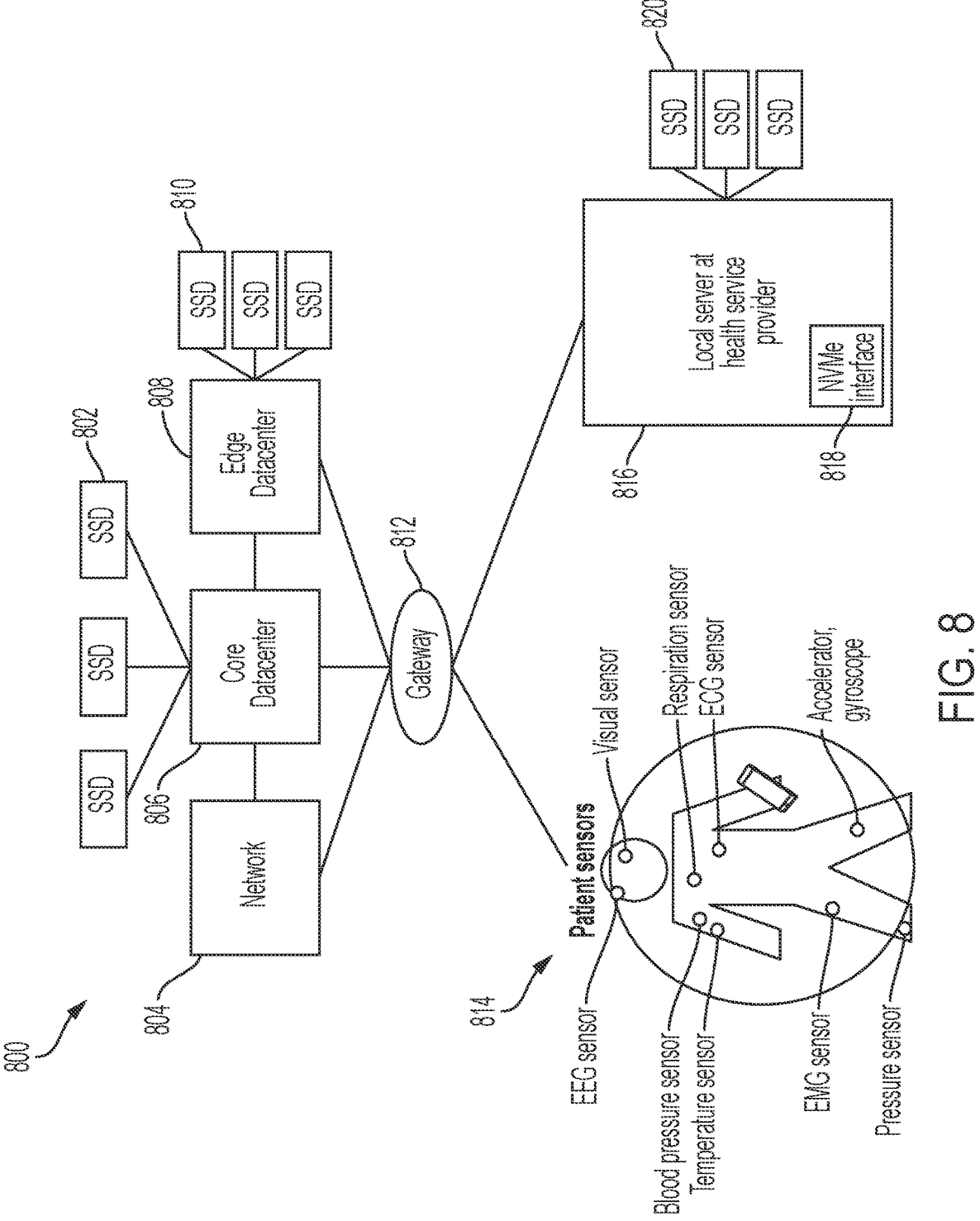
FIG. 8 shows a use case diagram for storage-efficient sensors and storage devices in healthcare applications in which patient health parameters can be directly transmitted to the storage devices, in accordance with example embodiments of the disclosure.

FIG. 8 shows a use case diagram 800 for healthcare applications, where patient health parameters could be directly deposited in the storage devices such as SSDs, in accordance with example embodiments of the disclosure. In some embodiments, the storage devices may perform initial raw data processing tasks and then notify the compute CPUs of a host for further processing and actions. For example, various sensors can be used to determine a patient's health parameters (e.g., temperature, fever status, disease-carrying status, infection status (e.g., Coronavirus COVID-19 related infection status), perspiration, heart rate, stool composition, body fat percentage, blood pressure, sleep pattern, combinations thereof, and/or the like). These parameters may be transmitted as data by the sensors to various storage devices, which can process and filter the data for further examination by a healthcare provider.

For example, diagram 800 shows a network 804, a core datacenter 806, and an edge datacenter 808 that can be part of an edge computing network. As used herein, "edge computing" can refer to distributed computing systems which bring computation and data storage physically closer to the location where such resources may be needed, for example, to improve response times and save bandwidth. Edge computing can serve to move certain aspects of cloud computing, network control, and storage to network edge platforms (e.g., edge datacenters and/or devices) that may be physically closer to resource-limited end devices, for example, to support computation-intensive and latency-critical applications. Accordingly, edge computing may lead to a reduction in latency and an increase in bandwidth on network architectures that incorporate both edge and core datacenters. In some aspects, to provide low-latency services, an edge computing paradigm may optimize an edge computing platform design, aspects of which are described herein.

Further, diagram 800 shows first storage devices 802 coupled to the core datacenter 806, and second storage devices 810 coupled to the edge datacenter 808. Diagram 800 further shows that the network 804, core datacenter 806, and edge datacenter 808 can be coupled to a gateway 812. Diagram 800 further shows sensors 814 associated with a patient, a local server 816 at a health service provider having an NVMe-oF interface 818, and third storage devices 820. As noted, the sensors 814 can collect data and can transmit the data to a local server 816 via an NVMe-oF protocol over a gateway 812. The data can reside on the local server's third storage devices 820. Either a copy of a portion of the data or additional data from the sensors 814 can be transmitted, via the gateway 812, to one or more of the network 804, core datacenter 806, and/or edge datacenter 808, where it can be stored on the first storage devices 802 and/or second storage devices 810. A device (e.g., a host, not shown) connected to any of the network 804, core datacenter 806, or edge datacenter 808 can request access to the data or a filtered form of the data. For example, the device can run a search, filtering, or sorting operation on the data. In some embodiments, the storage devices can include a processing element (e.g., an FPGA, an ASIC, or a core processor) that can execute the request.

In some aspects, the local server 816 or a host device (not shown) may use artificial intelligence (AI) to perform one or more of the searching, filtering, or sorting operations, and can serve to find patterns in the data collected by the sensors in the aggregate or individually. For example, the AI can be used to detect one or more diseases based on one patient's health condition based on sensor data, or based on aggregated data from many patients showing similar symptoms.

In some embodiments, the core datacenter 806 can include a dedicated entity that can house computer systems and associated components, such as telecommunications and storage systems and/or components. Further, the core datacenter 806 can include various servers that have computational, network, and storage resources for use in executing workloads, storing associated data, communicating data with the network 804, edge datacenter 808, and/or other portions (not shown) of the network architecture. In some embodiments, the core datacenter 806 can be connected to various devices (e.g., user devices). For example, the connection can be a wired connection (e.g., Ethernet-based) or a wireless connection (e.g., Wi-Fi, 5G, and/or cellular based).

In some embodiments, the edge datacenter 808 can refer to a dedicated entity that can house computer systems and associated components, such as telecommunications and storage systems, and which can have many of the same or similar capabilities as core datacenters; however, the edge datacenter 808 may generally have a smaller physical footprint in comparison to the core datacenter. Further, the edge datacenter 808 may be positioned physically closer to end users, and can thereby provide decreased latencies for certain workloads and applications. In some embodiments, the edge datacenter 808 can be connected to a core datacenter or other edge datacenters (e.g., a mobile edge datacenter). Moreover, the edge datacenter 808 can receive workload requests (e.g., requests to obtain data from the storage devices) from various devices directly connected to the edge datacenter 808. In another embodiment, the edge datacenter 808 can transmit a portion of a workload to other edge datacenters or core datacenters.

Figure 9:
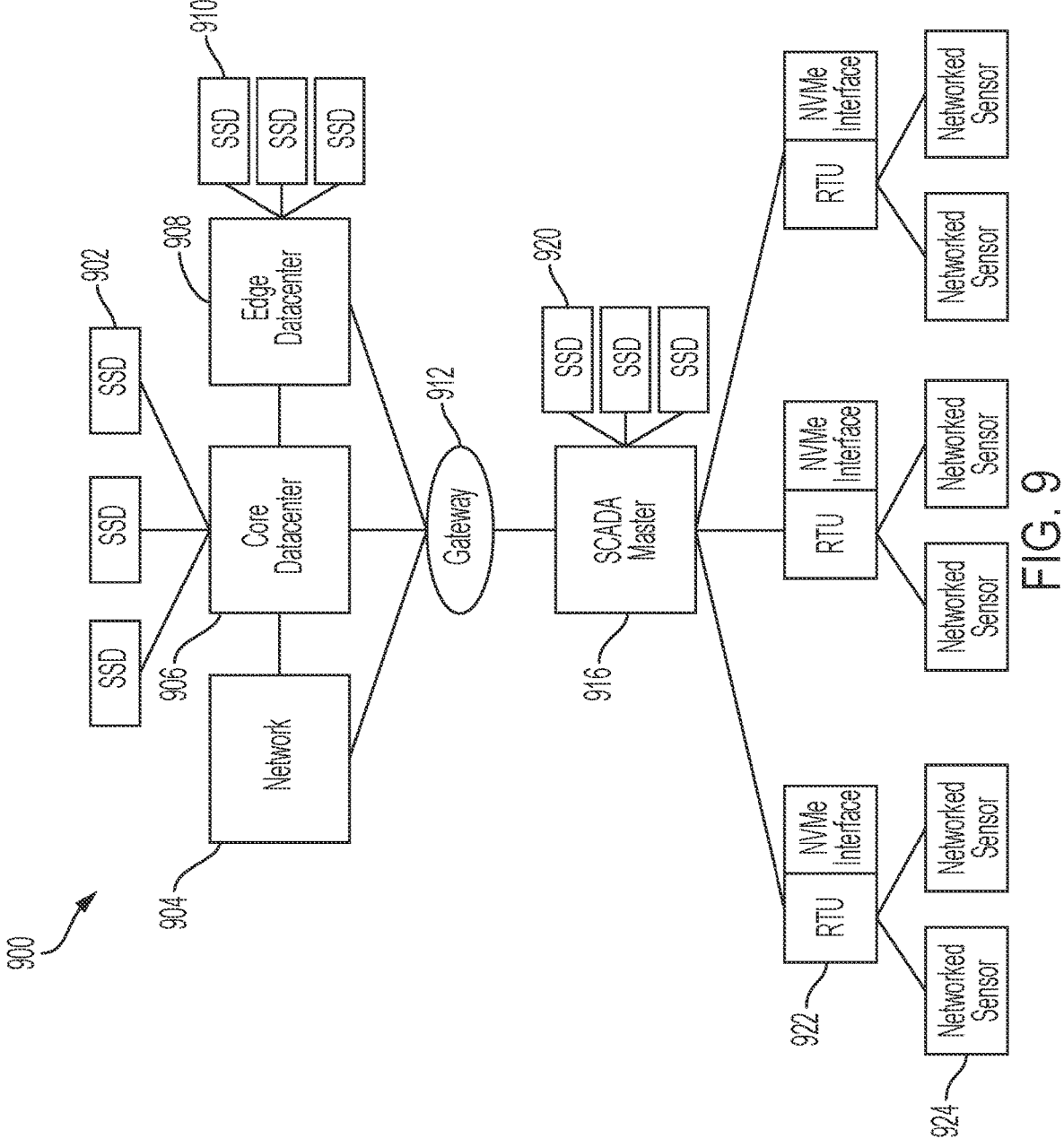
FIG. 9 shows a use case diagram for storage-efficient sensors and storage devices in industrial process automation and control applications, in accordance with example embodiments of the disclosure.

FIG. 9 shows a use case diagram 900 for industrial process automation and control applications, in accordance with example embodiments of the disclosure. In some embodiments, data can be gathered from a large number of sensors scattered over a factory campus, stored in the SSDs, and then notify analytics and control CPUs. For example, diagram 900 shows a network 904, a core datacenter 906, and an edge datacenter 908. Further, diagram 900 shows first storage devices 902 coupled to the core datacenter 906, and second storage devices 910 coupled to the edge datacenter 908. Diagram 900 further shows that the network 904, core datacenter 906, and edge datacenter 908 can be coupled to a gateway 912. Diagram 900 further shows networked sensors 924 which can be in the field. For example, the networked sensors 924 can be connected to a remote telemetry unit (RTU) 922 having an NVMe-oF interface for communicating via NVMe-oF with the networked sensors 924. The RTUs can then be aggregated at a supervisory control and data acquisition (SCADA) master 916 control system, where there can be additional storage devices 920 for storing the data from the networked sensors 924.

Diagram 900 further shows networked sensors 924 in the field collecting data, connected to the RTU 922 having the NVMe-oF interface. The networked sensors 924 can transmit data in accordance with the NVMe-oF protocol to the RTUs and, ultimately, to the SCADA master 916's storage devices 920. The SCADA master 916 can aggregate the data from the sensors and RTUs and can store at least a part of the data on storage devices 920. In some embodiments, either a copy of a portion of the data or additional data from the networked sensors 924 can be transmitted, via the gateway 912, to one or more of the network 904, core datacenter 906, and/or edge datacenter 908, where it can be stored on the first storage devices 902 and/or second storage devices 910. A device (e.g., a host, not shown) connected to any of the network 804, core datacenter 806, or edge datacenter 808 can request access to the data or a filtered form of the data. For example, the device can run a search, filtering, or sorting operation on the data. In some embodiments, the storage devices 902 and/or 910 can include a processing element (e.g., an FPGA, an ASIC, or a core processor) that can execute the request.

Figure 10:
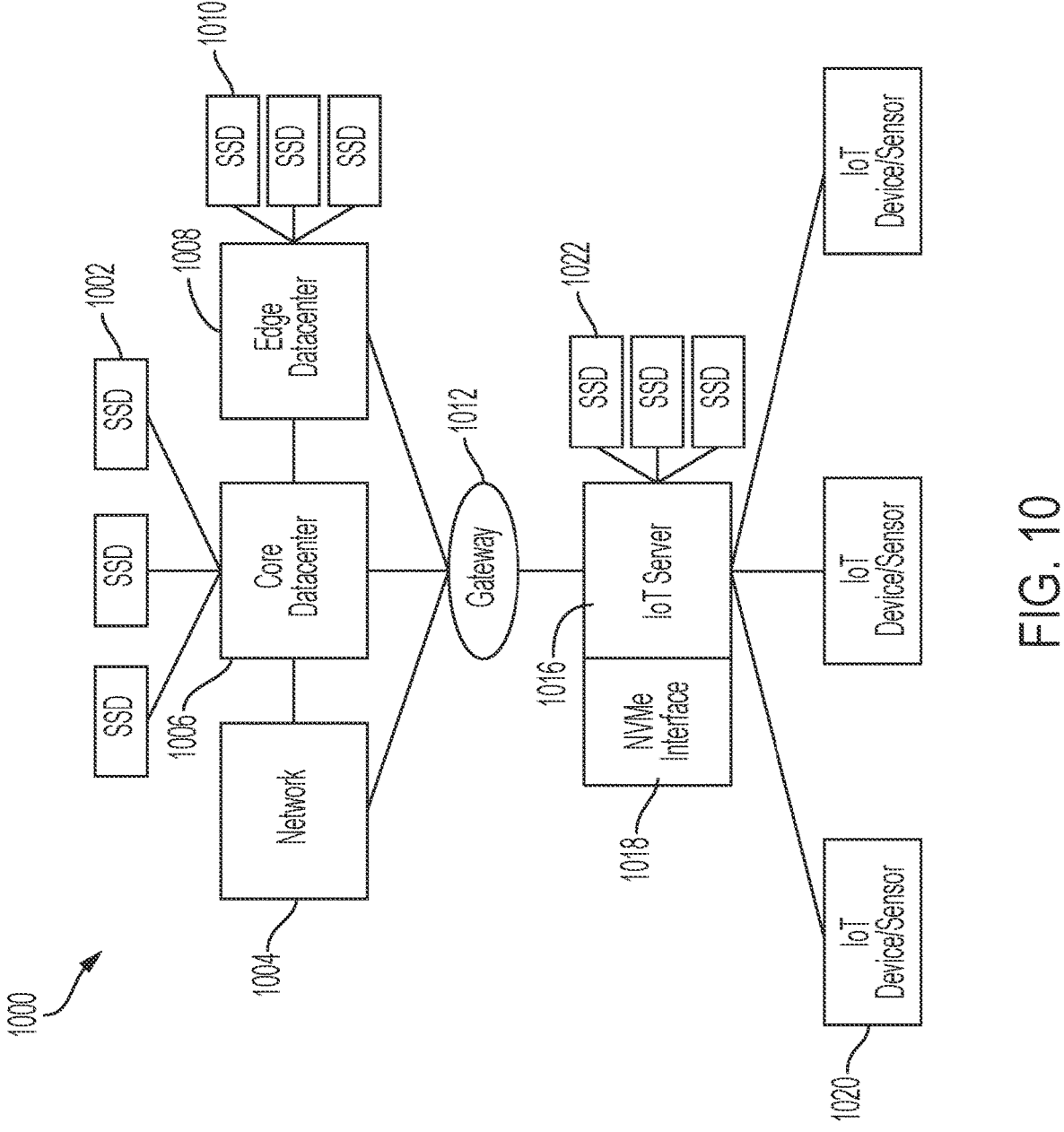
FIG. 10 shows a use case diagram for storage-efficient sensors and storage devices in Internet-of-Things (IoT) applications, in accordance with example embodiments of the disclosure.

FIG. 10 shows a use case diagram 1000 for Internet-of-Things (IoT) applications, in accordance with example embodiments of the disclosure. For example, the IoT devices can benefit from the direct data deposition in the SSDs to offload some of the data processing and analytics functions to the SSD. Diagram 1000 shows a network 1004, a core datacenter 1006, and an edge datacenter 1008. Further, diagram 1000 shows first storage devices 1002 coupled to the core datacenter 1006, and second storage devices 1010 coupled to the edge datacenter 1008. Diagram 1000 further shows that the network 1004, core datacenter 1006, and edge datacenter 1008 can be coupled to a gateway 1012. Diagram 1000 further shows IoT devices having sensors 1020, an IoT server 1016 having an NVMe interface 1018, and third storage devices 1022.

Diagram 1000 further shows that the IoT devices having sensors 1020 in the field (e.g., a home) can collect data, and can connect to the IoT server 1016 having the NVMe-oF interface 1018. The IoT devices having sensors 1020 can transmit data in accordance with the NVMe-oF protocol to the IoT server 1016 having storage devices 1022. The IoT server 1016 can aggregate the data from the IoT devices having sensors 1020 and can store at least a part of the data on storage devices 1022. In some embodiments, either a copy of a portion of the data or additional data from the IoT devices having sensors 1020 can be transmitted, via the gateway 1012, to one or more of the network 1004, core datacenter 1006, and/or edge datacenter 1008, where it can be stored on the first storage devices 1002 and/or second storage devices 1010. A device (e.g., a host, not shown) connected to any of the network 1004, core datacenter 1006, or edge datacenter 1008 can request access to the data or a filtered form of the data. For example, the device can run a searching, filtering, or sorting operation on the data. In some embodiments, the storage devices 1002 and/or 1010 can include a processing element (e.g., an FPGA, an ASIC, or a core processor) that can execute the request.

One example embodiment in which the elements shown and described in connection with FIG. 10 can further include a casino system. In such system, sensor data associated with sensors 1020 of the casino (e.g., cameras, temperature sensors, monitoring equipment, and other sensors) can flow through and be modified by (e.g., filtered, aggregated, processed, etc., and/or stored at least partially at storage device (s) 1022) different tiers of processing at local servers (e.g., similar, but not necessarily identical, to the IoT server 1016) before being transmitted to a central server (not shown). Further, data associated with the sensors 1020 (e.g., data stored at least partially at device(s) 1022) of a first casino (or subset of the first casino), for example, within a chain of casinos may be linked to via the network 1004 via one or more datacenters (e.g., a core datacenter 1006 and/or one or more edge datacenters 1008) connected to the server(s) (e.g., IoT server 1016 or a centralized server). In some embodiments, the casino may be located on or otherwise associated with private property and have private data (e.g., private consumer data) that may be stored at least partially on local servers. Further, there can be at least a portion of data or derivative data (e.g., metadata) based on the private data that can be transmitted over a public network such as network 1004 and processed and/or stored via the one or more datacenters (e.g., a core datacenter 1006 and/or one or more edge datacenters 1008). Example non-limiting use cases for the data that can be gathered, processed, anonymized, filtered, stored, and/or the like from the sensors can include, but is not limited to, performing facial detection of blacklisted players; detecting unusual activity; monitoring dealer (s), other casino employees, gamblers, etc.; detecting mannerisms of interest (e.g., facial cues, walking patterns, etc.) associated with users; determining usage activities associated with table sensors, slot machines, and/or the like; monitoring disease states of users (e.g., users having COVID-19); combinations thereof; and/or the like.

Figure 11:
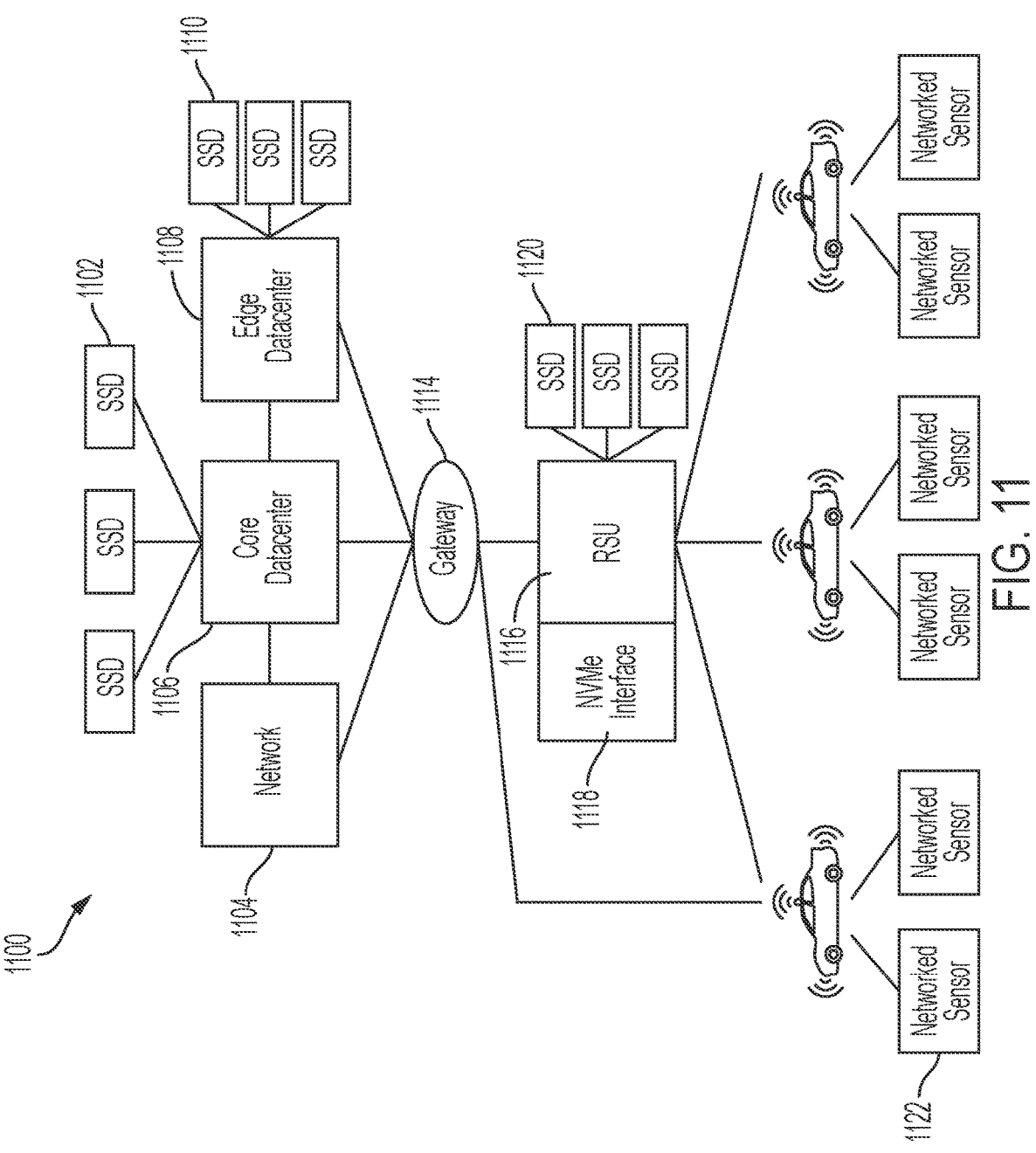
FIG. 11 shows a use case diagram for storage-efficient sensors and storage devices in autonomous vehicle fleet management applications, in accordance with example embodiments of the disclosure.

FIG. 11 shows a use case diagram 1100 for autonomous vehicle fleet management applications, in accordance with example embodiments of the disclosure. For example, a fleet of autonomous vehicles may need automated fleet management. The autonomous cars may periodically send a large amount of data, such as location, vehicle health, vehicle status parameters, customer demands, and information from other vehicles over the network. The raw data may be needed to be stored persistently for legal, operational, and management purposes. The autonomous cars may directly connect to the storage devices (e.g., SSDs) and deposit data. The storage devices may perform some data processing functions, including, but not limited to, performing data format conversions, event monitoring, filtering, sorting, etc., as well as providing data deposition notifications to analytics and management hosts.

Diagram 1100 shows a network 1104, a core datacenter 1106, and an edge datacenter 1108. Further, diagram 1100 shows first storage devices 1102 coupled to the core datacenter 1106, and second storage devices 1110 coupled to the edge datacenter 1108. Diagram 1100 further shows that the network 1104, core datacenter 1106, and edge datacenter 1108 can be coupled to a gateway 1114. Diagram 1100 further shows autonomous vehicles having sensors 1122, a roadside unit (RSU) 1116 having an NVMe interface 1118, and third storage devices 1120.

Diagram 1100 further shows that the networked sensors 1122 in the field (e.g., the roads) can collect data, and can connect to the server of an RSU 1116 having the NVMe-oF interface 1118. The networked sensors 1122 can transmit data in accordance with the NVMe-oF protocol to the RSU 1116 having storage devices 1120. The RSU 1116 can aggregate the data from the networked sensors 1122 and can store at least a part of the data on storage devices 1120. In some embodiments, either a copy of a portion of the data or additional data from the networked sensors 1122 can be transmitted, via the gateway 1114, to one or more of the network 1104, core datacenter 1106, and/or edge datacenter 1108, where it can be stored on the first storage devices 1102 and/or second storage devices 1110. A device (e.g., a host, not shown) connected to any of the network 1104, core datacenter 1106, or edge datacenter 1108 can request access to the data or a filtered form of the data. For example, the device can run a searching, filtering, or sorting operation on the data. In some embodiments, the storage devices 1102 and/or 1110 can include a processing element (e.g., an FPGA, an ASIC, or a core processor) that can execute the request.

Figure 12:
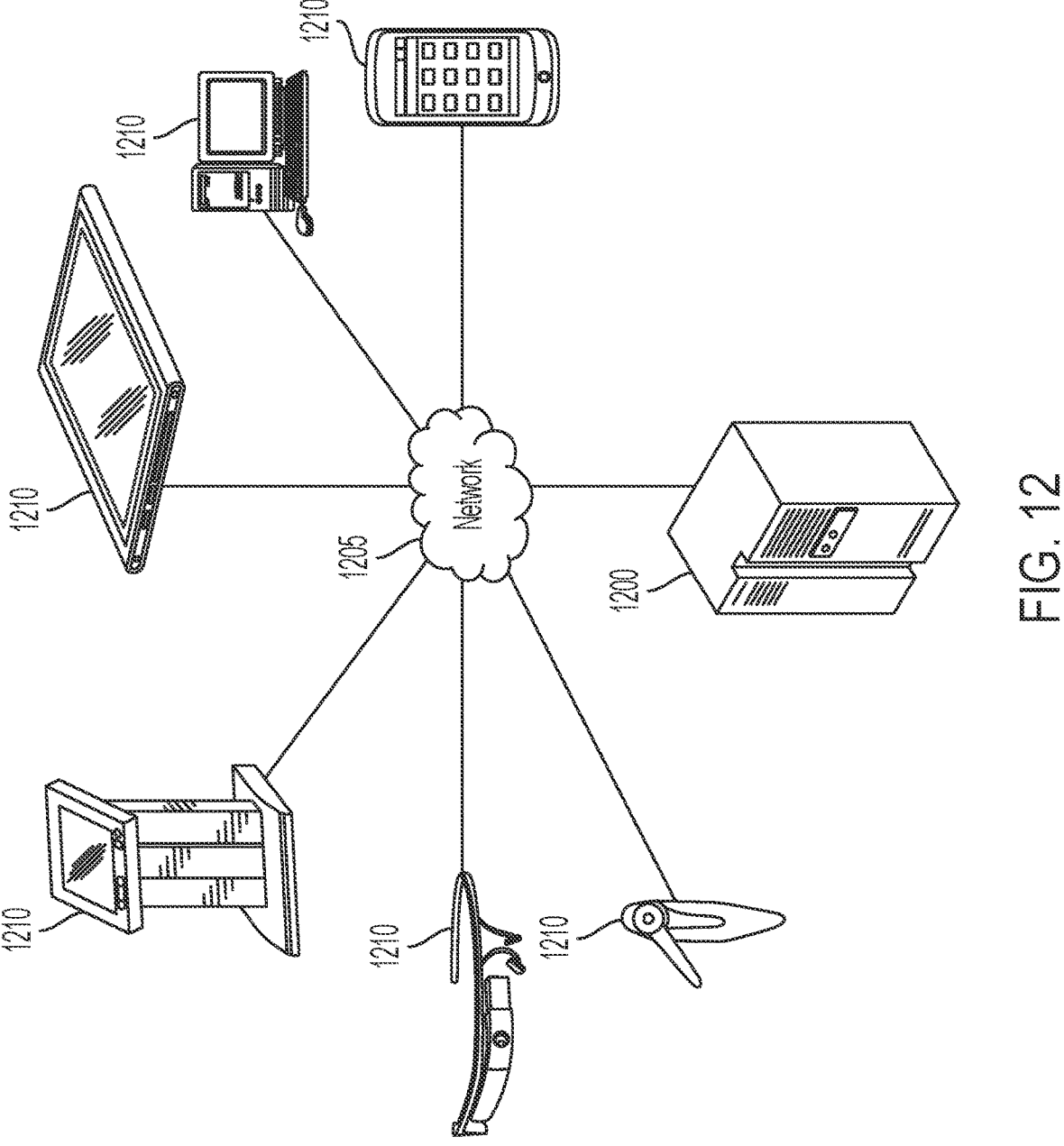
FIG. 12 shows an example schematic diagram of a system illustrating various devices that can be used in connection with various embodiments of the present disclosure.

FIG. 12 shows an example schematic diagram of a system that can be used to practice embodiments of the present disclosure. As shown in FIG. 12, some example embodiments may include one or more management computing entities 1200, one or more networks 1205, and one or more user devices 1210. Each of these components, entities, devices, systems, and similar words used interchangeably herein may be in direct or indirect communication with, for example, one another over the same or different wired or wireless networks (e.g., the network 210 shown and described in connection with FIG. 2, including, but not limited to, edge datacenters and/or core datacenters). Additionally, while FIG. 12 illustrates the various system entities as separate, stand-alone entities, the various embodiments are not limited to this example architecture. Further, the management computing entities 1200 can include a computational module or a physical module that can be configured to operate in connection with a sensor (e.g., sensor 202 and/or 206 shown and described in connection with FIG. 2), a storage device (e.g., storage device 206 shown and described in connection with FIG. 2), or an application on a user device (e.g., application 216 shown and described in connection with FIG. 2) described herein. In various embodiments, the management computing entities 1200 can be configured to perform one or more suitable operations described herein, including, but not limited to, performing a filtering, searching, sorting, and/or related operation on the sensor data before it is transmitted to the storage device, after it resides on the storage device, and/or after it is transmitted at least partially to a host device and/or application. As noted, the communications can be performed using any suitable protocols (e.g., a 5G network protocol), as described further herein.

Figure 13:
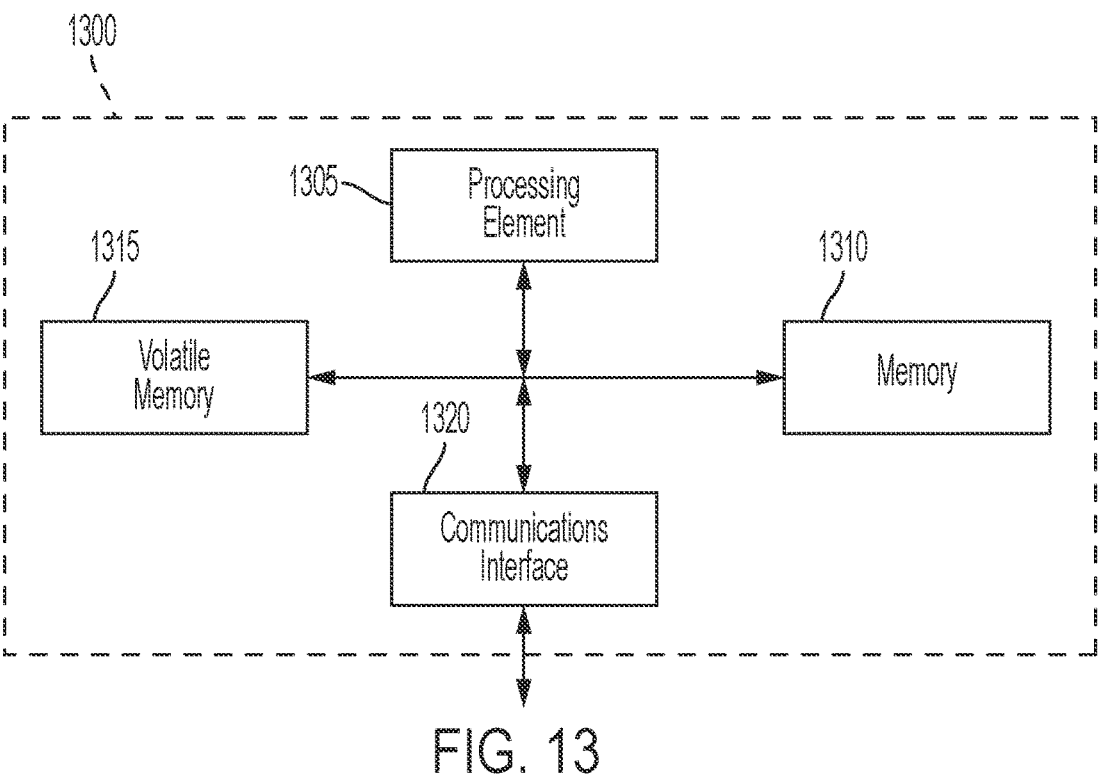
FIG. 13 shows an example schematic diagram of certain aspects of a management computing entity that can be used in connection with various embodiments of the present disclosure, in accordance with example embodiments of the disclosure.

FIG. 13 shows an example schematic diagram of a management computing entity 1300, in accordance with example embodiments of the disclosure. Further, the management computing entity 1300 may include a content component, a processing component, and a transmitting component (not shown). For example, the content component may serve to determine signals indicative of data (e.g., video, audio, text, data, combinations thereof, and/or the like) to be received and/or transmitted over the network architecture described herein. In another embodiment, the determination of sensor data for transmission or reception by any of the various components of the sensor architecture described herein may be, for example, based on a user input to the device at a host, a predetermined schedule of data transmissions on the network, changes in network conditions, and the like. In one embodiment, the signal may include data may be encapsulated in a data frame (e.g., a 5G data frame) that is configured to be sent from a device to one or more devices on the network.

In another embodiment, the processing element 1305 may serve to determine various parameters associated data transmitted over the network (e.g., network 1205). For example, the processing element 1305 may serve to pre-process data, filter data, sort data, remove noise from data, aggregate data from multiple sensors, combinations thereof, and/or the like.

In one embodiment, a transmitting component (not shown) may serve to transmit the data from one device (e.g., a sensor) to another device (e.g., a storage device) on the network. For example, the transmitting component may serve to prepare a transmitter (e.g., transmitter 1404 of FIG. 14, below) to transmit the signal over the network. For example, the transmitting component may queue data in one or more buffers, may ascertain that the transmitting device (e.g., sensor) and associated transmitters are functional and have adequate power to transmit the signal over the network, and/or may adjust one or more parameters (e.g., modulation type, signal amplification, signal power level, noise rejection, combinations thereof, and/or the like) associated with the transmission of the data.

In general, the terms "computing entity," "computer," "entity," "device," "system," and/or similar words used interchangeably herein may refer to, for example, one or more sensors, storage devices, servers, computers, computing entities, desktop computers, mobile phones, tablets, phablets, notebooks, laptops, distributed systems, gaming consoles (e.g., Xbox, PlayStation, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and/or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used interchangeably herein. In one embodiment, these functions, operations, and/or processes can be performed on data, content, information, and/or similar terms used interchangeably herein.

As indicated, in one embodiment, the management computing entity 1200 may also include one or more communications interfaces 1320 for communicating with various computing entities, such as by communicating data, content, information, and/or similar terms used interchangeably herein that can be transmitted, received, operated on, processed, displayed, stored, and/or the like. For instance, the management computing entity 1200 may communicate with user devices 1210 and/or a variety of other computing entities.

As shown in FIG. 13, in one embodiment, the management computing entity 1200 may include or be in communication with one or more processing elements 1305 (also referred to as processors, processing circuitry, and/or similar terms used interchangeably herein) that communicate with other elements within the management computing entity 1200 via a bus, for example. As will be understood, the processing element 1305 may be embodied in a number of different ways. For example, the processing element 1305 may be embodied as one or more complex programmable logic devices (CPLDs), FPGAs, microprocessors, multi-core processors, coprocessing entities, application-specific instruction-set processors (ASIPs), microcontrollers, and/or controllers. Further, the processing element 1305 may be embodied as one or more other processing devices or circuitry. The term "circuitry" may refer to an entirely hardware embodiment or a combination of hardware and computer program products. Thus, the processing element 1305 may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processing element 1305 may be configured for a particular use or configured to execute instructions stored in volatile or non-volatile media or otherwise accessible to the processing element 1305. As such, whether configured by hardware or computer program products, or by a combination thereof, the processing element 1305 may be capable of performing steps or operations according to embodiments of the present disclosure when configured accordingly.

In one embodiment, the management computing entity 1200 may further include or be in communication with non-volatile media (also referred to as non-volatile storage, memory, memory storage, memory circuitry, and/or similar terms used interchangeably herein). In one embodiment, the non-volatile storage or memory may include one or more non-volatile storage or memory media 1310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The terms "database," "database instance," "database management system," and/or similar terms used interchangeably herein may refer to a collection of records or data that is stored in a computer-readable storage medium using one or more database models, such as a hierarchical database model, network model, relational model, entity—relationship model, object model, document model, semantic model, graph model, and/or the like.

In one embodiment, the management computing entity 1200 may further include or be in communication with volatile media (also referred to as volatile storage, memory, memory storage, memory circuitry, and/or similar terms used interchangeably herein). In one embodiment, the volatile storage or memory may also include one or more volatile storage or memory media 1315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 1305. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 1200 with the assistance of the processing element 1305 and operating system.

As indicated, in one embodiment, the management computing entity 1200 may also include one or more communications interfaces 1320 for communicating with various computing entities, such as by communicating data, content, information, and/or similar terms used interchangeably herein that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 1200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, wireless universal serial bus (USB) protocols, and/or any other wireless protocol.

Although not shown, the management computing entity 1200 may include or be in communication with one or more input elements, such as a keyboard input, a mouse input, a touchscreen/display input, motion input, movement input, audio input, pointing device input, joystick input, keypad input, and/or the like. The management computing entity 1200 may also include or be in communication with one or more output elements (not shown), such as audio output, video output, screen/display output, motion output, movement output, and/or the like.

As will be appreciated, one or more of the management computing entity 1200's components may be located remotely from other management computing entity 1200 components, such as in a distributed system. Furthermore, one or more of the components may be combined, and additional components performing functions described herein may be included in the management computing entity 1200. Thus, the management computing entity 1200 can be adapted to accommodate a variety of needs and circumstances. As will be recognized, these architectures and descriptions are provided for example purposes only and are not limiting to the various embodiments.

A "user" may be an individual, a family, a company, an organization, an entity, a department within an organization, a representative of an organization and/or person, and/or the like. In one example, users may be employees, residents, customers, and/or the like. For instance, a user may operate a user device 1210 that includes one or more components that are functionally similar to those of the management computing entity 1200.

In various aspects, the processing component, the transmitting component, and/or the receiving component (not shown) may be configured to operate on one or more networks and may include aspects of the functionality of the management computing entity 1200, as shown and described in connection with FIGS. 12 and 13 herein. For example, the processing component, the transmitting component, and/or the receiving component may be configured to be in communication with one or more processing elements 1305, memory 1310, and/or volatile memory 1315, and may include a communication interface 1320 (e.g., to facilitate communication between devices).

Figure 14:
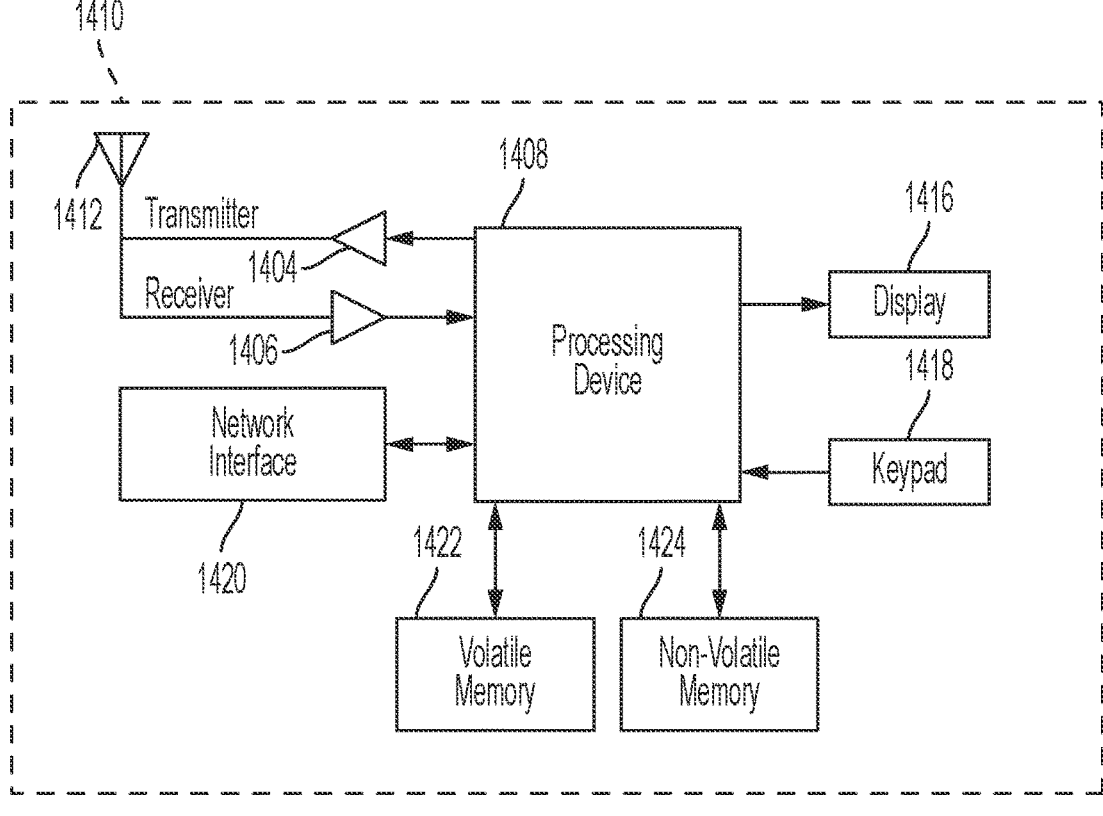
FIG. 14 shows an example schematic diagram of an example device (e.g., a user device, such as a mobile device) that can be used in connection with various embodiments of the present disclosure, in accordance with example embodiments of the disclosure.

FIG. 14 shows an example schematic diagram of a user device, in accordance with example embodiments of the disclosure. FIG. 14 provides an illustrative schematic representative of a user device 1410 that can be used in conjunction with embodiments of the present disclosure, for example, a user device associated with a host (e.g., host 212 shown and described in connection with FIG. 2) and running an application (e.g., application 216 shown and described in connection with FIG. 2) that requests data stored on a storage device (e.g., storage device 206 shown and described in connection with FIG. 2). In general, the terms "device," "system," "computing entity," "entity," and/or similar words used interchangeably herein may refer to, for example, one or more computers, computing entities, desktops, mobile phones, tablets, phablets, notebooks, laptops, distributed systems, gaming consoles (e.g., Xbox, PlayStation, Wii), watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, and/or the like, and/or any combination of devices or entities adapted to perform the functions, operations, and/or processes described herein. User device 1210 can be operated by various parties. As shown in FIG. 14, the user device 1210 can include an antenna 1412, a transmitter 1404 (e.g., radio), a receiver 1406 (e.g., radio), and a processing device 1408 (e.g., CPLDs, microprocessors, multi-core processors, coprocessing entities, ASIPs, microcontrollers, and/or controllers) that provides signals to and receives signals from, respectively, the transmitter 1404 and the receiver 1406.

The signals provided to and received from the transmitter 1404 and the receiver 1406, respectively, may be used to transfer data between devices and may include signaling information in accordance with air interface standards of applicable wireless systems. In this regard, the user device 1210 may be capable of operating with one or more air interface standards, communication protocols, modulation types, and access types. For example, the user device 1210 may operate in accordance with any of a number of wireless communication standards and protocols, such as those described above with regard to the management computing entity 1200. According to some example embodiments, the user device 1210 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 1210 may operate in accordance with multiple wired communication standards and protocols, such as those described above with regard to the management computing entity 1200 via a network interface 1420.

Via these communication standards and protocols, the user device 1210 can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The user device 1210 can also download changes, add-ons, and updates, for instance, to its firmware, software (e.g., including executable instructions, applications, and program components), and operating system.

According to one embodiment, the user device 1210 may include location determining aspects, devices, components, functionalities, and/or similar words used interchangeably herein. The location determining aspects may be used to determine the locations of one or more sensors or the user device itself in order to more efficiently transmit data needed by a user device 1210 with the least latency. For example, the location determining aspects may determine that a weather data request associated with an application running on the user device 1210 can be best serviced by devices (e.g., sensors, storage devices, or both) residing in a first location as opposed to a second location. In one embodiment, the location determining component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device 1210's (or sensor's) position in connection with a variety of other systems, including cellular towers, Wi-Fi access points, and/or the like. Similarly, the user device 1210 may include indoor positioning aspects, such as a location determining component adapted to acquire, for example, latitude, longitude, altitude, geocode, course, direction, heading, speed, time, date, and/or various other information/data. Some of the indoor systems may use various position or location technologies, including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 1210 may also comprise a user interface (that can include a display 1416 coupled to a processing element 1408) and/or a user input interface (coupled to a processing element 1408). For example, the user interface may be a user application, browser, user interface, and/or similar words used interchangeably herein, executing on and/or accessible via the user device 1210 to interact with and/or cause the display of information from the management computing entity 1200, as described herein. The user input interface can comprise any of a number of devices or interfaces allowing the user device 1210 to receive data, such as a keypad 1418 (hard or soft), a touch display, voice/speech or motion interfaces, or other input devices. In embodiments including a keypad 1418, the keypad 1418 can include (or cause the display of) the conventional numeric (0-9) and related keys (#, *), and other keys used for operating the user device 1210, and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 1210 can also include volatile storage or memory 1422 and/or non-volatile storage or memory 1424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1210. As indicated, this may include a user application that is resident on the entity or accessible through a browser or other user interface for communicating with the management computing entity 1200 and/or various other computing entities.

In another embodiment, the user device 1210 may include one or more components or functionality that are the same as or similar to those of the management computing entity 1200, as described in greater detail above. As will be recognized, these architectures and descriptions are provided for example purposes only and are not limiting to the various embodiments.

FIG. 15 shows a diagram 1500 of a method for operating a system including the sensors and storage devices variously described herein in the context of the sensor-based storage architecture, in accordance with example embodiments of the disclosure. At block 1502, the disclosed systems can determine one or more parameters associated with a storage device using a discovery service and via a network over a medium. Non-limiting examples of such parameters can include information associated with the sensor and storage device's capabilities and features (e.g., bandwidth, total storage, network interfaces supported, wireless or wired protocols supported, combinations thereof, and/or the like). In one example, the sensor can provide its data transfer capabilities, and the storage device can provide its data receiving capabilities, and one or more parameters associated with the data transfer can be determined by the devices such that the data transfer is performed in an efficient and/or optimal manner.

At block 1504, the disclosed systems can transmit, based on the parameters, data from at least one sensor to a storage device via the network over the medium. In some embodiments, the data transfer can be performed over a wireless medium (e.g., via Bluetooth, Wi-Fi, cellular, 5G, combinations thereof, and/or the like). In another embodiment, a sensor can transfer data based on predetermined rules. For example, the rules may dictate that the sensor begin transferring data when a predetermined amount of data fills its local buffer, when a network condition is met, when a certain type of data is detected, when a second device provides it with a corresponding instruction, when a user provides it with a corresponding instruction, when a wireless connection to a base station is stronger than a predetermined threshold, at a particular time of day, combinations thereof, and/or the like. In another embodiment, the sensor can be configured to transmit the data using a storage protocol such as NVMe-oF and a transport protocol such as an Ethernet protocol, an RDMA protocol, an iWARP protocol, a TCP/IP protocol, an RoCE protocol, an InfiniBand protocol, a 5G wireless protocol, a Wi-Fi protocol, a Bluetooth protocol, or a BLE protocol. In some embodiments, the storage device can include one or more namespaces or streams, and the sensor can specify a namespace or stream on the storage device for the storing at least a portion of the data.

At block 1506, the disclosed systems can process the data and store at least a portion of the data at the storage device. For example, the processing of the data can include, but is not limited to, a filtering operation, a sorting operation, or a search operation, combinations thereof, and/or the like. Further, the storage device can include at least one of an FPGA, an ASIC, or a processor to process the data. In some embodiments, the data comprises data associated with multiple sensors, and the processing of the data can include aggregating the data from the different sensors. In some embodiments, the disclosed systems can cause the storage device to transmit a data deposited report command to a host to indicate that a data has been deposited by the sensors at the storage device and is ready for processing by the host.

At block 1508, the disclosed systems can transmit at least a second portion of the data via the network to at least one host. In some embodiments, the host can include multiple hosts, and a controller of the storage device can transmit at least a second portion of the data to the multiple hosts. In some embodiments, the disclosed systems can transmit a completion entry to notify the host(s) that the data transmission is complete.

In various embodiments, the storage device can include at least one of 1) a namespace or 2) a stream, and the method further comprises specifying, by the sensor, the namespace or the stream for the storing the at least a portion of the data. Further, the disclosed systems can further determine that the portion of the data is stored at the storage device, determine that a size associated with the portion of data exceeds a threshold, and transmit an asynchronous notification to the host based on the determination of the size exceeding the threshold. In other embodiments, the asynchronous notification can include at least one of a data offset information, a data location information, or a data length information.

As noted, AI can be used in performing various tasks associated with the collected sensor data (e.g., filtering, searching, sorting, aggregating, detecting patterns within the data, combinations thereof, and/or the like). AI can be used in the routing of data and commands between the portions of a network architecture, for example, by monitoring data flow over different portions of the network over time (e.g., historical data) for enhanced data and command routing, and/or for optimal data placement on storage devices. Accordingly, embodiments of devices, and/or related components described herein, can employ AI to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or can determine states of the system, environment, etc., from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations. In some aspects, the neural network can include, but is not limited to including, at least one of a long short term memory (LSTM) neural network, a recurrent neural network, a time delay neural network, or a feed forward neural network.

A classifier can map an input attribute vector, $z=(z1, z2, z3, z4, \ldots, zn)$, to a confidence that the input belongs to a class, as by $f(z)=confidence$ (class). Such classification can employ a probabilistic and/or statistical-based analysis to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to, training data. Other directed and undirected model classification approaches include, for example, naïve Bayes, Bayesian networks, decision trees, neural networks, fuzzy logic models, and/or probabilistic classification models providing different patterns of independence can be employed. "Classification," as used herein, also is inclusive of statistical regression that is utilized to develop models of priority.

In certain examples, the disclosed systems can be implemented in connection with the disclosed sensor, storage system, and host architecture for purposes and ease of illustration of certain embodiments. It is to be understood that the disclosed systems can be used in connection with network architectures other than those explicitly described herein. In some respects, one or more components of the disclosed sensor, storage system, and host architecture may be used in connection with the next evolution of cellular networks, for example, in fifth-generation (5G) networks. Accordingly, the sensor, storage system, and host architecture can be implemented in connection with 5G cellular networks to enable a low-latency network architecture. To provide such low-latency services, the disclosed systems can minimize the response time through the filtering and/or compression of the data transmitted between the components of the sensor, storage system, and host architecture, as described further herein. Moreover, the disclosed systems can be used with predetermined configurations of an edge computing platform to meet latency requirements through edge-server architecture design and edge-computing service optimization.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "example" is used herein to mean "serving as an example, instance, or illustration." Any embodiment described herein as "example" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, for example, a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field-programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
receiving, by a storage device, a host command from a host computing device;
receiving, by the storage device, from a first sensor, a first request transmitted by the first sensor, wherein a first network connection is established between the first sensor and the storage device based on the first request;
receiving over the first network connection, by the storage device, from the first sensor, a write command and first data, wherein the write command and the first data are generated by the first sensor, wherein the write command identifies a first location in the storage device for storing the first data;
receiving, by the storage device, from a second sensor different from the first sensor, a second request transmitted by the second sensor, wherein a second network connection is established between the second sensor and the storage device based on the second request;
receiving over the second network connection, by the storage device, from the second sensor, a second command and second data, wherein the second command and the second data are generated by the second sensor, wherein the second command identifies a second location in the storage device for storing the second data;

executing the write command by the storage device and storing the first data in the first location of the storage device;
executing, by the storage device, the host command based on the storing of the at least a portion of the first data;
transmitting, by the storage device, a notification to the host computing device based on executing the host command;
receiving, by the storage device, based on the notification to the host computing device, a third command from the host computing device different from the first sensor and the second sensor; and
transmitting, by the storage device, the at least the portion of the first data to the host computing device based on the third command.

2. The method of claim 1 further comprising:
receiving a query from the first sensor; and
providing, based on the query, information about the storage device, wherein the first sensor is configured to establish a connection with the storage device over a network based on the information.

3. The method of claim 2, wherein the information includes at least one of bandwidth, storage capacity, supported interface, or supported protocol.

4. The method of claim 1 further comprising:
receiving, by the storage device, a fourth command from a second computing device different from the host computing device; and
transmitting, by the storage device, the first data to the second computing device based on the fourth command.

5. The method of claim 1 wherein the executing the write command includes aggregating the first data and the second data.

6. The method of claim 1, further comprising:
determining that a size associated with the first data exceeds a threshold; and
transmitting a message to the host computing device based on the determination of the size exceeding the threshold.

7. The method of claim 6, wherein the message comprises at least one of a data offset information, a data location information, or a data length information.

8. The method of claim 1, wherein the first data comprises at least one of a temperature data, a pressure data, a water quality data, a proximity data, a chemical data, a motion data, an electromagnetic field data, a humidity data, a photo file, a video file, or an audio file.

9. The method of claim 1, wherein the first sensor is configured to communicate with the storage device over a data communications network.

10. The method of claim 1, wherein the first sensor is configured to transmit the first data using at least one of a wired protocol or a wireless protocol.

11. The method of claim 1, wherein the storage device comprises at least one of a field-programmable gate array (FPGA), an application-specific integrated circuit (ASIC), or a processor to process the first data.

12. The method of claim 1, wherein the executing of the write command includes at least one of a filtering operation, a sorting operation, or a search operation.

13. The method of claim 1 further comprising:
transmitting, by the storage device, a fourth command associated with the write command to the first sensor, wherein the fourth command is for notifying the first sensor of a criterion associated with the first data.

14. The method of claim 1, wherein the first location of the storage device identified by the write command includes identification of a namespace or stream of the storage device.

15. A storage device, comprising:

a processor; and a memory, wherein the memory stores instructions that cause the processor to:

receive a host command from a host computing device;

receive from a first sensor, a first request transmitted by the first sensor, wherein a first network connection is established between the first sensor and the storage device based on the first request;

receive over the first network connection, from the first sensor, a write command and first data, wherein the write command and the first data are generated by the first sensor, wherein the write command identifies a first location in the storage device for storing the first data;

receive from a second sensor different from the first sensor, a second request transmitted by the second sensor, wherein a second network connection is established between the second sensor and the storage device based on the second request;

receive over the second network connection, from the second sensor, a second command and second data, wherein the second command and the second data are generated by the second sensor, wherein the second command identifies a second location in the storage device for storing the second data;

execute the write command and store the first data in the first location of the storage device;

execute the host command based on the storing of the at least a portion of the first data;

transmit a notification to the host computing device based on executing the host command;

receive, based on the notification to the host computing device, a third command from the host computing device different from the first sensor and the second sensor; and transmit the at least the portion of the first data to the host computing device based on the third command.

16. The storage device of claim 15, wherein the memory stores instructions that further cause the processor to:

receive a query from the first sensor; and provide, based on the query, information about the storage device, wherein the first sensor is configured to establish a connection with the storage device over a network based on the information.

17. The storage device of claim 16, wherein the information includes at least one of bandwidth, storage capacity, supported interface, or supported protocol.

18. The storage device of claim 15, wherein the instructions further cause the processor to:

receive a fourth command from a second computing device different from the host computing device; and transmit the first data to the second computing device based on the fourth command.

19. The storage device of claim 15, wherein the instructions that cause the processor to execute the write command include instructions that cause the processor to aggregate the first data and the second data.

20. The storage device of claim 15, wherein the first location of the storage device identified by the write command includes identification of a namespace or stream of the storage device.

\* \* \* \* \*